United States Patent
Ikeda

(10) Patent No.: US 12,307,700 B2
(45) Date of Patent: *May 20, 2025

(54) OBJECT NUMBER ESTIMATION DEVICE, CONTROL METHOD, AND PROGRAM

(71) Applicant: NEC Corporation, Tokyo (JP)

(72) Inventor: Hiroo Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 576 days.

This patent is subject to a terminal disclaimer.

(21) Appl. No.: 17/636,431

(22) PCT Filed: Aug. 30, 2019

(86) PCT No.: PCT/JP2019/034177
§ 371 (c)(1),
(2) Date: Feb. 18, 2022

(87) PCT Pub. No.: WO2021/038840
PCT Pub. Date: Mar. 4, 2021

(65) Prior Publication Data
US 2022/0292706 A1    Sep. 15, 2022

(51) Int. Cl.
*G06T 7/60* (2017.01)
*G06N 3/045* (2023.01)
(Continued)

(52) U.S. Cl.
CPC ............... *G06T 7/60* (2013.01); *G06N 3/045* (2023.01); *G06N 3/08* (2013.01); *G06V 10/25* (2022.01);
(Continued)

(58) Field of Classification Search
CPC . G06T 2207/20016; G06T 2207/20081; G06T 2207/20084; G06V 30/2504; G06V 10/82; G06V 20/695; G06V 30/19173
See application file for complete search history.

(56) References Cited

U.S. PATENT DOCUMENTS

2018/0005071 A1* 1/2018 Idrees .................. G06V 10/457

FOREIGN PATENT DOCUMENTS

JP    2018-005520 A    1/2018
WO    2014/207991 A1   12/2014

OTHER PUBLICATIONS

Zhang, Yingying, et al. "Single-image crowd counting via multi-col. convolutional neural network." Proceedings of the IEEE conference on computer vision and pattern recognition. 2016. (Year: 2016).*

(Continued)

*Primary Examiner* — Raphael Schwartz

(57) ABSTRACT

An object count estimation apparatus (2000) includes a first feature extraction network (2042), a first counting network (2044), a second feature extraction network (2062), and a second counting network (2064). The first feature extraction network (2042) generates a first feature map (20) by performing convolution processing on a target image (10). The first counting network (2044) estimates the number of target objects having a size included in a first predetermined range by performing processing on the first feature map (20). The second feature extraction network (2062) generates a second feature map (30) by performing convolution processing on the first feature map (20). The second existence estimation network (2064) estimates the number of target objects having a size included in a second predetermined range by performing processing on the second feature map (30). A size included in the first predetermined range is smaller than a size included in the second predetermined range.

19 Claims, 14 Drawing Sheets

(51) Int. Cl.
*G06N 3/08* (2023.01)
*G06V 10/25* (2022.01)

(52) U.S. Cl.
CPC .............. *G06T 2207/20081* (2013.01); *G06T 2207/20084* (2013.01); *G06T 2207/30242* (2013.01)

(56) References Cited

OTHER PUBLICATIONS

Japanese Office Communication for JP Application No. 2021-541930 mailed on Jan. 31, 2023 with English Translation.
International Search Report for PCT Application No. PCT/JP2019/034177, mailed on Nov. 19, 2019.

Lu, Chuan-Pin, et al., "Development of a Mushroom Growth Measurement System Applying Deep Learning for Image Recognition", Agronomy, vol. 9, No. 1, Jan. 14, 2019, pp. 1-21. ISSN:2073-4395. <DOI: 10.3390/agronomy9010032> [online] [retrieved:Nov. 5, 2019], Internet: <URL: https://www.mdpi.com/2073-4395/9/1/32>.

Li, Jianan et al., "Scale-Aware Fast R-CNN for Pedestrian Detection". IEEE Transactions On Multimedia, vol. 20, No. 4. Oct. 6, 2017, pp. 985-996, ISSN:1520-9210, <DOI:10.1109/TMM.2017.2759508>.

Zeng, Lingke et al., "Multi-Scale Convolutional Neural Networks for Crowd Counting", Proceedings of the 2017 IEEE International Conference on Image Processing (ICIP 2017). Sep. 20, 2017, pp. 465-469, ISBN:978-1-5090-2175-8, <DOI: 10.1109/ICIP.2017.8296324>.

\* cited by examiner

FIG. 2
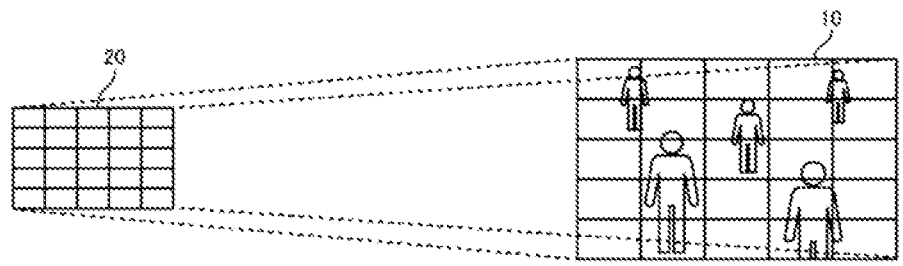
FEATURE OF TARGET IMAGE 10 IS MORE MINUTELY CAPTURED AS SIZE OF FEATURE MAP INCREASES → SUITABLE FOR COUNTING OF RELATIVELY SMALL-SIZED TARGET OBJECT
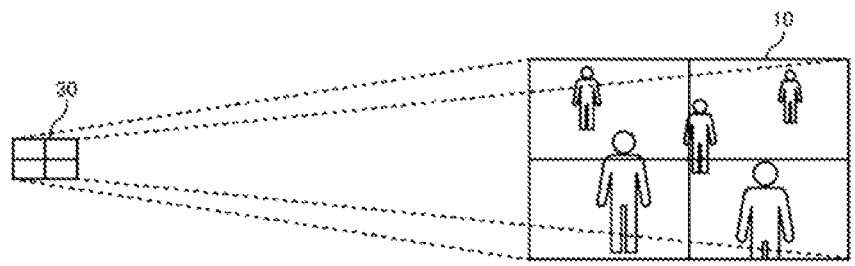
FEATURE OF TARGET IMAGE 10 IS MORE GENERALLY CAPTURED AS SIZE OF FEATURE MAP DECREASES → SUITABLE FOR COUNTING OF RELATIVELY LARGE-SIZED TARGET OBJECT

OBJECT NUMBER ESTIMATION DEVICE, CONTROL METHOD, AND PROGRAM

This application is a National Stage Entry of PCT/JP2019/034177 filed on Aug. 30, 2019, the contents of all of which are incorporated herein by reference, in their entirety.

TECHNICAL FIELD

The present invention relates to a technology for estimating the number of objects included in an image.

BACKGROUND ART

Development of technologies for estimating the number of objects included in an image has been underway. For example, PTL 1 discloses a technology for estimating the number of people for each partial region preset to an input image by extracting a partial image from the input image, based on the partial region, and inputting the extracted partial image to a prelearned estimator. The invention is premised on a certain relation (certain ratio) between the size of a partial image being an input (the size of a partial region) and the size of an object being a target of counting.

RELATED DOCUMENT

Patent Document

PTL 1: International Application Publication No. WO 2014/207991

SUMMARY OF THE INVENTION

Technical Problem

The invention in PTL 1 has a problem that a large amount of labor is required for setting the aforementioned partial region. The reason is that the size of a partial region related to a head size needs to be determined and a partial region needs to be set at any position in an input image while the head size (appearance) on the input image at any position in the image is being checked.

Note that other methods of setting a partial region include a method of using a camera parameter indicating a pose of a camera. Specifically, the method estimates a camera parameter, computes a head size at any position in an input image by using the estimated camera parameter, and automatically computes and sets the size of a partial region at any position. However, in the method, a large amount of labor is required for estimation of an accurate camera parameter, and, as a result, a large amount of overall labor is also required for setting a partial region.

The present invention has been made in view of the problem described above, and an object of the present invention is to provide a technology for estimating the number of objects included in an image with a small amount of labor.

Solution to Problem

An object count estimation apparatus according to the present invention includes: 1) a feature extraction network generating a first feature map and a second feature map by performing convolution processing on a target image; 2) a first counting network estimating, for each cell in the first feature map, a number of a target object having a size within a first predetermined range for a first estimation region being an image region in the target image related to the cell; and 3) a second counting network estimating, for each cell in the second feature map, a number of a target object having a size within a second predetermined range for a second estimation region being an image region in the target image related to the cell.

A size of the first feature map is larger than a size of the second feature map. A size included in the first predetermined range is smaller than a size included in the second predetermined range.

A control method according to the present invention is executed by a computer. The computer includes: 1) a feature extraction network generating a first feature map and a second feature map by performing convolution processing on a target image; 2) a first counting network estimating, for each cell in the first feature map, a number of a target object having a size within a first predetermined range for a first estimation region being an image region in the target image related to the cell; and 3) a second counting network estimating, for each cell in the second feature map, a number of a target object having a size within a second predetermined range for a second estimation region being an image region in the target image related to the cell.

The control method includes: 1) by the feature extraction network, generating the first feature map and the second feature map from the target image; 2) by the first counting network, estimating a number of a target object having a size within the first predetermined range for the each first estimation region by using the first feature map; and 3) by the second counting network, estimating a number of a target object having a size within the second predetermined range for the each second estimation region by using the second feature map.

A size of the first feature map is larger than a size of the second feature map. A size included in the first predetermined range is smaller than a size included in the second predetermined range.

A program according to the present invention causes a computer to execute the control method according to the present invention.

Advantageous Effects of Invention

The present invention provides a technology for estimating the number of objects included in an image with a small amount labor.

BRIEF DESCRIPTION OF THE DRAWINGS

FIG. 2 is a diagram illustrating a correspondence between a feature map and an input image (target image).

DESCRIPTION OF EMBODIMENTS

Example embodiments of the present invention will be described below by using drawings. Note that, in every drawing, similar components are given similar signs, and description thereof is omitted as appropriate. Further, unless otherwise described, each block in each block diagram represents a function-based configuration rather than a hardware-based configuration.

Example Embodiment 1

Overview

Figure 1:
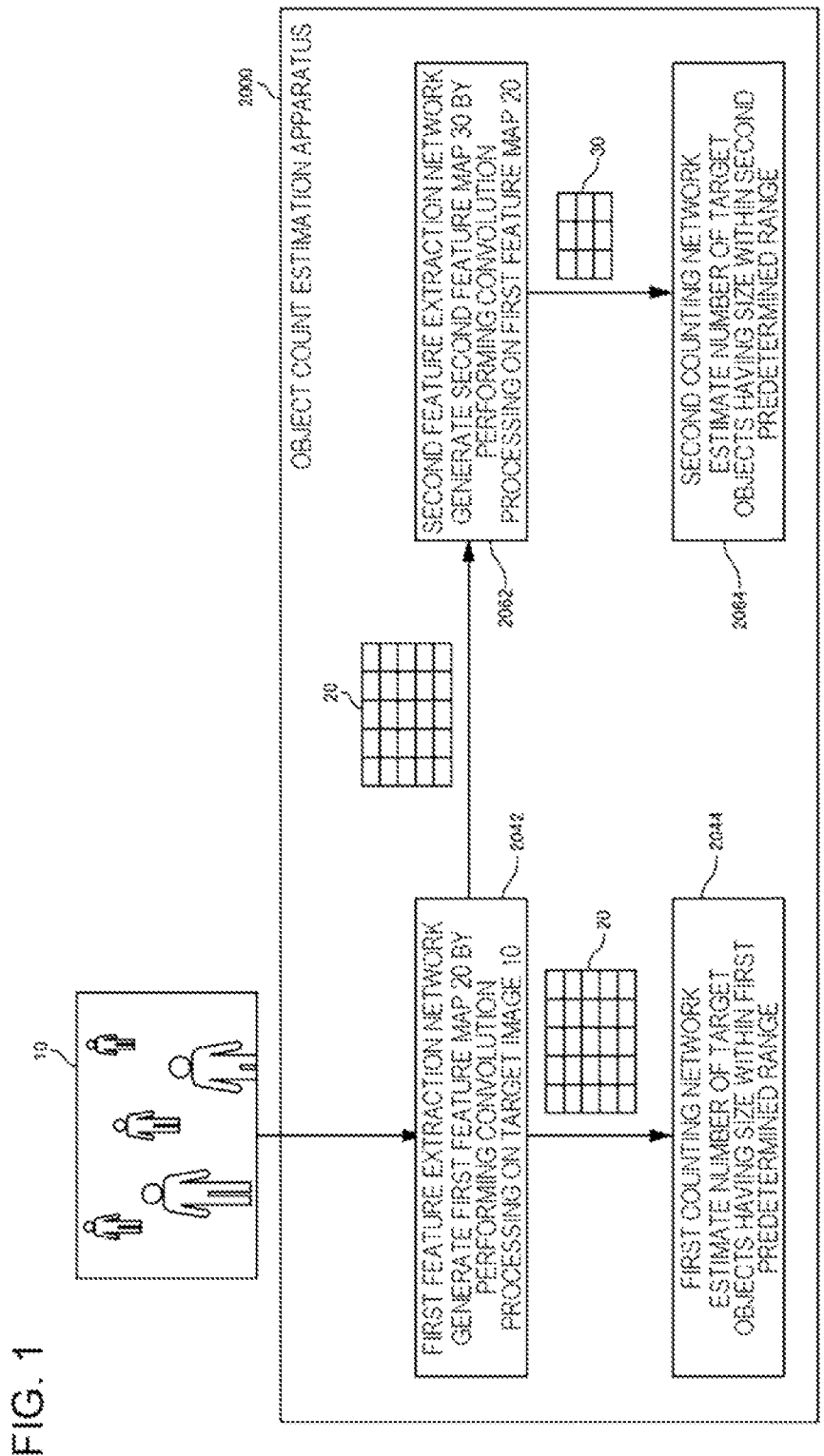
FIG. 1 is a diagram conceptually illustrating processing performed by an object count estimation apparatus according to an example embodiment 1 of the present invention.

FIG. 1 is a diagram conceptually illustrating processing performed by an object count estimation apparatus 2000 according to the present example embodiment. The object count estimation apparatus 2000 acquires an image and estimates the number of objects of a predetermined type included in the acquired image. An image being a target of estimation is hereinafter referred to as a target image 10. Further, an object of a predetermined type being a target of estimation is referred to as a target object. Note that a target image 10 is described with omission of a channel direction in FIG. 1. For example, when a color image is used as a target image 10, the number of input channels accepting the target image 10 may be set to 2 or greater (such as 3 in a case of an RGB image).

Examples of the aforementioned predetermined type that may be employed include various types such as a person, a vehicle, a tree, an animal, and an umbrella. In other words, the object count estimation apparatus 2000 estimates the number of people, the number of vehicles, or the like included in a target image 10. Further, the predetermined type may be part of an object (for example, part of a human body such as a head, a hand, or a foot). For example, when a target object is a "human head," the object count estimation apparatus 2000 estimates the number of human heads included in a target image 10. Note that, unless otherwise noted, a human head is handled as a target object in the description from here onward.

The object count estimation apparatus 2000 includes a first feature extraction network 2042, a first counting network 2044, a second feature extraction network 2062, and a second counting network 2064. The first feature extraction network 2042 generates a first feature map 20 by performing convolution processing on a target image 10. A first feature map 20 is input to the first counting network 2044. Then, by performing processing (such as convolution processing) on the first feature map 20, the first counting network 2044 estimates the number of target objects having a size within a first predetermined range for each image region in a target image 10 related to each cell (element) in the first feature map 20 (hereinafter referred to as a first estimation region). For example, each of the first feature extraction network 2042 and the first counting network 2044 is provided by a convolutional neural network. Note that a first feature map 20 and a second feature map 30 to be described later are described in FIG. 1 with omission of a channel direction. The number of channels related to a feature map may be set to any number equal to or greater than 1.

The second feature extraction network 2062 acquires a first feature map 20 generated by the first feature extraction network 2042 and generates a second feature map 30 by performing convolution processing on the first feature map 20. In other words, a second feature map 30 is a feature map generated by further performing convolution processing on a first feature map 20. The size of a second feature map 30 is smaller than the size of a first feature map 20 due to convolution processing. For example, the second feature extraction network 2062 is provided by a convolutional neural network.

Note that the first feature extraction network 2042 and the second feature extraction network 2062 may be viewed to constitute one large network. Specifically, the former part of to network outputting a second feature map 30 by inputting a target image 10 is the first feature extraction network 2042, and the latter part is the second feature extraction network 2062.

A second feature map 30 is input to the second counting network 2064. Then, by performing processing (such as convolution processing) on the second feature map 30, the second counting network 2064 estimates the number of target objects having a size within a second predetermined range for each image region in a target image 10 related to each cell (element) in the second feature map 30 (hereinafter referred to as a second estimation region). For example, the second counting network 2064 is provided by a convolutional neural network.

The first predetermined range and the second predetermined range are defined in such a way as not to overlap each other. More specifically, the first predetermined range and the second predetermined range are defined in such a way that a size included in the first predetermined range is smaller than a size included in the second predetermined range. Accordingly, a target object counted by the first counting network 2044 is not counted by the second counting network 2064. Similarly, a target object counted by the second counting network 2064 is not counted by the first feature extraction network 2042.

Each network previously undergoes learning in such a way as to be able to provide a function thereof. A learning method of each network included in the object count estimation apparatus 2000 according to the present example embodiment will be described in an example embodiment 4.

Note that a learning function may be provided in the object count estimation apparatus 2000 or may be provided in an apparatus other than the object count estimation apparatus 2000. In the latter case, the object count estimation apparatus 2000 acquires a network previously undergoing learning by the other apparatus and uses the acquired network. Note that "acquisition of a network" herein may refer to processing of acquiring a network itself (a program of a network set with parameters undergoing learning) or may be processing of acquiring parameters of a network acquired as a result of learning and setting the parameters to a program of the network prepared inside the object count estimation apparatus 2000.

Typical Advantageous Effect

When counting of objects is performed by using a feature map extracted from an input image, a region on the input image related to a cell (element) in the feature map becomes larger as the size of the feature map decreases. Therefore, a cell in a small-sized feature map captures a general feature of an input image. For this reason, a small-sized feature map is considered suitable for detection of a large-sized object. Conversely, a cell in a large-sized feature map captures a minute feature of an input image. Therefore, a large-sized feature map is considered suitable for detection of a small-sized object.

FIG. 2 is a diagram illustrating a correspondence between a feature map and an input image (target image 10). As described above, the size of the second feature map 30 is smaller than that of the first feature map 20. Therefore, an image region on the target image 10 related to a cell in the second feature map 30 (second estimation region) is larger than an image region on the target image 10 related to a cell in the 10 first feature map 20 (first estimation region). Therefore, the second feature map 30 captures a relatively general feature about the target image 10 compared with the first feature map 20. Accordingly, the second feature map 30 is suitable for counting of relatively large-sized target object, and the first feature map 20 is suitable for counting of a relatively small-sized target object.

Then, the object count estimation apparatus 2000 performs counting of relatively small-sized target objects by using the first feature map 20 having a large size on one hand and performs counting of relatively large-sized target objects by using the second feature map 30 having a small size on the other hand. Thus, target objects with varying sizes can be precisely detected and counted without requiring prior knowledge about the size and the position of a target object included in a target image 10 (setting of a partial region in PTL 1). Accordingly, precise counting with a small amount of labor required for advance setting is achieved.

Further, in the object count estimation apparatus 2000, a first feature map 20 is generated by performing convolution processing on a target image 10, and a second feature map 30 is generated by performing convolution processing on the first feature map 20. By thus generating the second feature map 30 from the first feature map 20, a feature extracted from the target image 10 is shared between the first feature map 20 and the second feature map 30. Performing learning by using the thus shared feature improves estimation precision.

The object count estimation apparatus 2000 can be used for various purposes. For example, the object count estimation apparatus 2000 can be used for purposes such as an apparatus or a function for performing suspicious person recognition, left-behind suspicious object recognition, tailgating recognition, abnormal condition recognition, and abnormal behavior recognition in the surveillance field requiring estimation of the number of objects from a camera or a stored image. Further, the object count estimation apparatus 2000 can be used for purposes such as an apparatus or a function for performing flow line analysis and behavior analysis in the field of marketing. Further, the object count estimation apparatus 2000 can be applied to purposes such as an input interface having a result of estimation of the number of objects from a camera or a stored image, and the positions (2D or 3D) of the objects as inputs. In addition, the object count estimation apparatus 2000 can be used for purposes such as a video/image retrieval apparatus or function having a result of estimation of the number of objects and the positions (2D or 3D) of the objects as a trigger or a key.

Note that the aforementioned description with reference to FIG. 1 is an exemplification for facilitation of understanding of the object count estimation apparatus 2000 and does not limit the functions of the object count estimation apparatus 2000. The object count estimation apparatus 2000 according to the present example embodiment will be described in more detail below.

Example of Functional Configuration of Object Count Estimation Apparatus 2000

Figure 3:
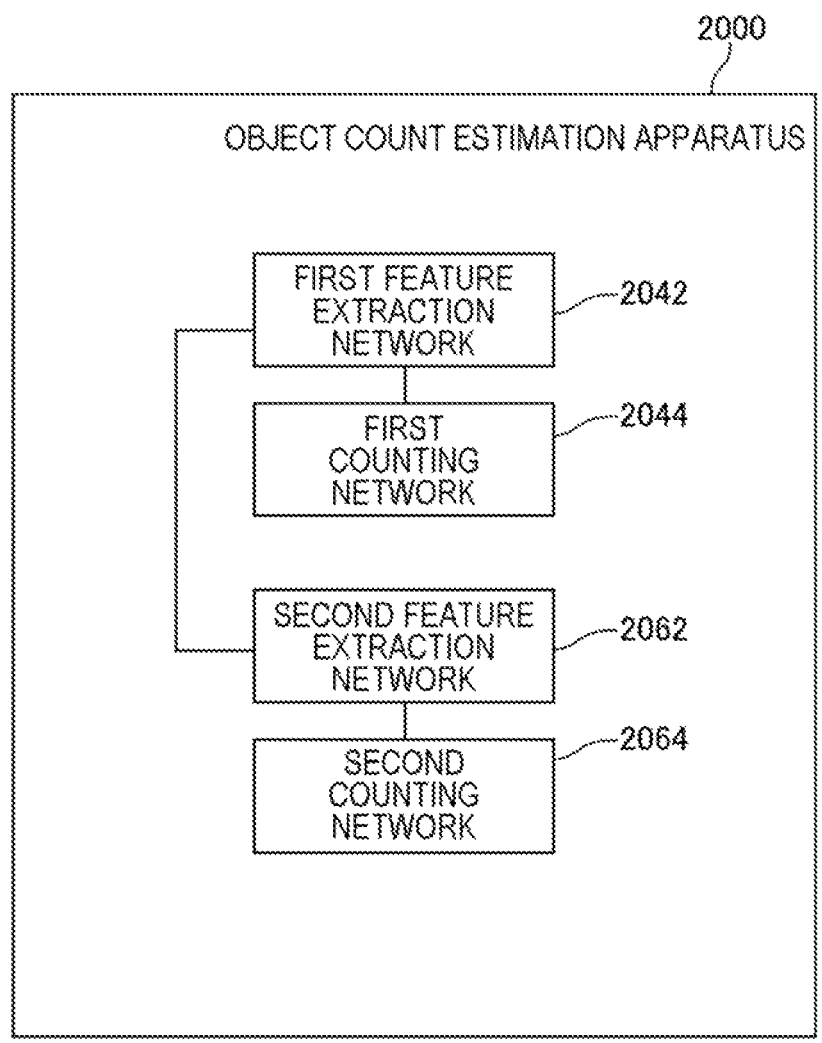
FIG. 3 is a block diagram illustrating a functional configuration of an object count estimation apparatus according to the example embodiment 1.

FIG. 3 is a block diagram illustrating a functional configuration of the object count estimation apparatus 2000 according to the example embodiment 1. The object count estimation apparatus 2000 includes the first feature extraction network 2042, the first counting network 2044, the second feature extraction network 2062, and the second counting network 2064. The first feature extraction network 2042 generates a first feature map 20 by performing convolution processing on a target image 10. For each cell in a first feature map 20, the first counting network 2044 estimates the number of target objects having a size within the first predetermined range for an image region in a target image 10 related to the cell (first estimation region).

The second feature extraction network 2062 generates a second feature map 30 by performing convolution processing on a first feature map 20. For each cell in a second feature map 30, the second counting network 2064 estimates the number of target objects having a size within the second predetermined range for an image region in a target image 10 related to the cell (second estimation region).

Hardware Configuration of Object Count Estimation Apparatus 2000

Each functional component in the object count estimation apparatus 2000 may be provided by hardware (such as a hardwired electronic circuit) providing the functional component or may be provided by a combination of hardware and software (such as a combination of an electronic circuit and a program controlling the circuit). The case of each functional component in the object count estimation apparatus 2000 being provided by a combination of hardware and software will be further described below.

Figure 4:
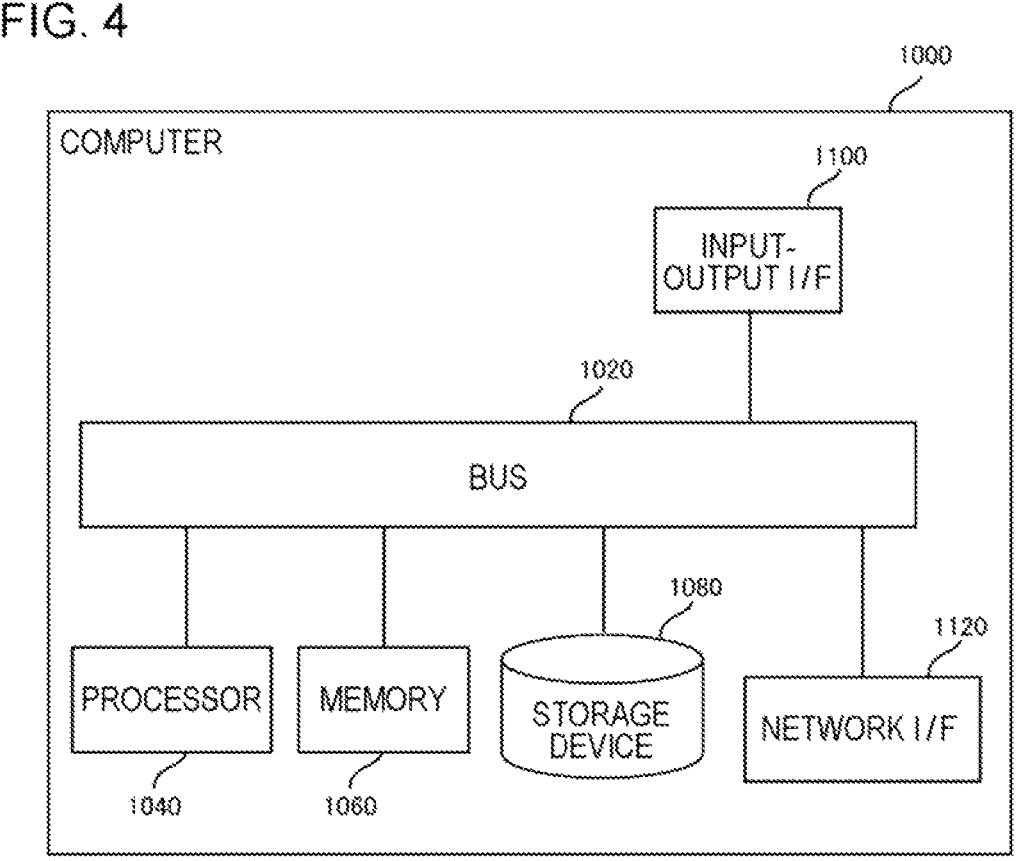
FIG. 4 is a diagram illustrating a computer for providing the object count estimation apparatus.

FIG. 4 is a diagram illustrating a computer 1000 for providing the object count estimation apparatus 2000. The computer 1000 may be any computer. For example, the computer 1000 is a personal computer (PC) or a server machine. The computer 1000 may be a dedicated computer designed for providing the object count estimation apparatus 2000 or may be a general-purpose computer.

The computer 1000 includes a bus 1020, a processor 1040, a memory 1060, a storage device 1080, an input-output interface 1100, and a network interface 1120. The bus 1020 is a data transmission channel for the processor 1040, the memory 1060, the storage device 1080, the input-output interface 1100, and the network interface 1120 to transmit and receive data to and from each other. Note that the method for interconnecting the processor 1040 and other components is not limited to a bus connection.

Examples of the processor 1040 include various processors such as a central processing unit (CPU), a graphics processing unit (GPU), and a field-programmable gate array (FPGA). The memory 1060 is a main storage provided by using a random access memory (RAM) or the like. The storage device 1080 is an auxiliary storage provided by using a hard disk, a solid state drive (SSD), a memory card, a read only memory (ROM), or the like.

The input-output interface 1100 is an interface for connecting the computer 1000 to an input-output device. For example, the input-output interface 1100 is connected to an input apparatus such as a keyboard and an output apparatus such as a display apparatus. The network interface 1120 is an interface for connecting the computer 1000 to a communication network. Examples of the communication network include a local area network (LAN) and a wide area network (WAN). The method for connecting the network interface 1120 to the communication network may be a wireless connection or a wired connection.

The storage device 1080 stores program modules providing the functional components in the object count estimation apparatus 2000. By reading each program module into the memory 1060 and executing the program module, the processor 1040 provides a function related to the program module.

The storage device 1080 may further store a target image 10. Note that a target image 10 has only to be information acquirable by the computer 1000 and does not need to be stored in the storage device 1080. For example, a target image 10 may be stored in a storage apparatus connected to the computer 1000 through the network interface 1120 [such as a network attached storage (NAS)].

Flow of Processing

Figure 5:
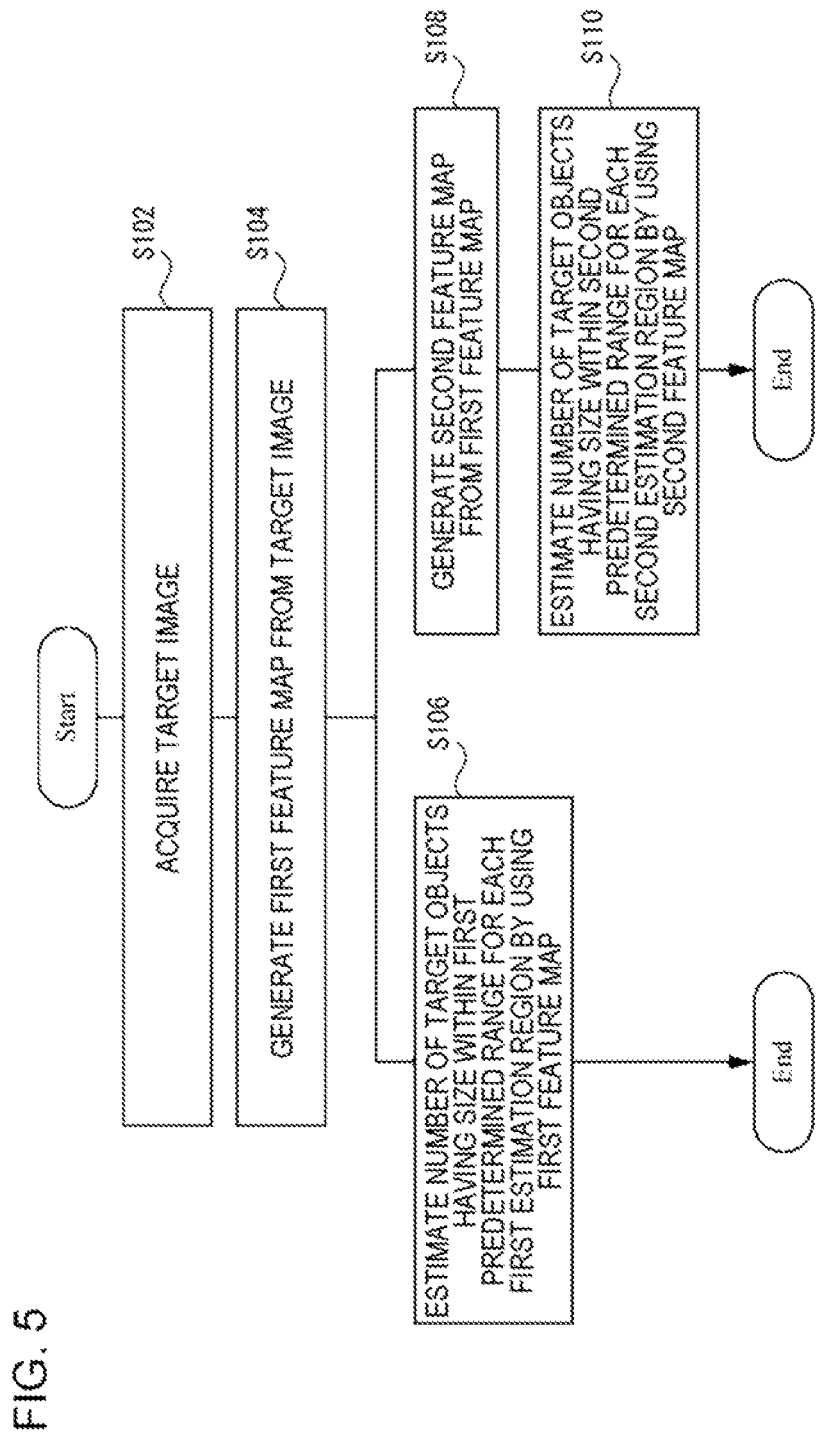
FIG. 5 is a flowchart illustrating a flow of processing executed by the object count estimation apparatus according to the example embodiment 1.

FIG. 5 is a flowchart illustrating a flow of processing executed by the object count estimation apparatus 2000 according to the example embodiment 1. The object count estimation apparatus 2000 acquires a target image 10 and inputs the target image 10 to the first feature extraction network 2042 (S102). The first feature extraction network 2042 generates a first feature map 20 from the target image 10 (S104). The first counting network 2044 outputs the number of target objects having a size within the first predetermined range for each estimation region by using the first feature map 20 (S106).

The second feature extraction network 2062 generates a second feature map 30 by using the first feature map 20 (S108). The second counting network 2064 outputs the number of target objects having a size within the second predetermined range for each estimation region by using the second feature map 30 (S110).

In FIG. 5, S106 is executed in parallel with S108 and S110. However, S106, S108, and S110 may be sequentially executed. The order may be any order as long as S110 is executed after S108.

Acquisition of Target Image 10: S102

The object count estimation apparatus 2000 acquires a target image 10 and inputs the target image 10 to the first feature extraction network 2042 (S102). Any method may be employed as the method for acquiring a target image 10 by the object count estimation apparatus 2000. For example, the object count estimation apparatus 2000 acquires an image output from another apparatus (such as a camera generating a target image 10) as a target image 10 or acquires an image stored in a storage apparatus accessible from the object count estimation apparatus 2000 as a target image 10.

It is assumed here that a plurality of images that can be handled as target images 10 exist. In this case, the object count estimation apparatus 2000 may acquire a specific image specified by a user as a target image 10 or may determine an image to be acquired as a target image 10 in accordance with a predetermined rule. In the latter case, for example, the object count estimation apparatus 2000 successively acquires a plurality of images stored in a storage apparatus in ascending order of generation time point.

Generation of First Feature Map 20: S104

The first feature extraction network 2042 generates a first feature map 20 from the target image 10 (S104). The first feature extraction network 2042 previously undergoes learning in such a way as to output a first feature map 20 in response to input of a target image 10. Therefore, the object count estimation apparatus 2000 can acquire a first feature map 20 by inputting a target image 10 to the first feature extraction network 2042.

Estimation of Number of Objects Having Size within First Predetermined Range: S106

In response to input of the first feature map 20, the first counting network 2044 estimates the number of target objects having a size within the first predetermined range for each first estimation region (an image region on the target image 10 related to each cell in the input first feature map 20) (S106). The first counting network 2044 previously undergoes learning in such a way as to output the number of target objects having a size within the first predetermined range for each first estimation region in response to input of a first feature map 20.

Generation of Second Feature Map 30: S108

In response to input of the first feature map 20, the second feature extraction network 2062 generates a second feature map 30 (S108). The second feature extraction network 2062 previously undergoes learning in such as way as to output a second feature map 30 in response to input of a first feature map 20.

Estimation of Number of Objects Having Size within Second Predetermined Range: S110

In response to input of the second feature map 30, the second counting network 2064 estimates the number of target objects having a size within the second predetermined range for each second estimation region (an image region on the target image 10 related to each cell in the input second feature map 30) (S110). The second counting network 2064 previously undergoes learning in such a way as to output the number of target objects having a size within the second predetermined range for each second estimation region in response to input of a second feature map 30.

Output of Information

The object count estimation apparatus 2000 outputs information acquired from the first counting network 2044 and the second counting network 2064. The object count estimation apparatus 2000 may output information output from the first counting network 2044 (information indicating the number of target objects for each first estimation region) as-is or may compute and output the number of target objects having a size within the first predetermined range for the entire target image 10. The latter value can be computed by adding up the numbers of target objects output from the first counting network 2044 for the respective first estimation regions.

Similarly, the object count estimation apparatus 2000 may output information output from the second counting network 2064 (information indicating the number of target objects for each second estimation region) as-is or may compute and output the number of target objects having a size within the second predetermined range for the entire target image 10. The latter value can be computed by adding up the numbers of target objects output from the second counting network 2064 for the respective second estimation regions.

Further, the object count estimation apparatus 2000 may compute the number of target objects included in the entire target image 10 by using the information output from the first counting network 2044 and the second counting network 2064. The value can be computed by adding up the number of target objects having a size within the first predetermined range and the number of target objects having a size within the second predetermined range over the entire target image 10.

Note that any method may be employed as the method of outputting information. For example, the object count estimation apparatus 2000 causes a display apparatus controllable from the object count estimation apparatus 2000 to display the various types of information described above, stores the various types of information into a storage apparatus accessible from the object count estimation apparatus 2000, or transmits the various types of information to another apparatus accessible from the object count estimation apparatus 2000.

Network Expansion

Up to this point, each of the numbers of the feature extraction networks and the counting networks that are included in the object count estimation apparatus 2000 has been assumed to be two for facilitation of description. However, the object count estimation apparatus 2000 may include three or more each of the networks. Specifically, n feature extraction networks from a first feature extraction network to an n-th feature extraction network (where n is an integer equal to or greater than 3) and n counting networks from a first counting network to an n-th counting network are provided in the object count estimation apparatus 2000.

Figure 6:
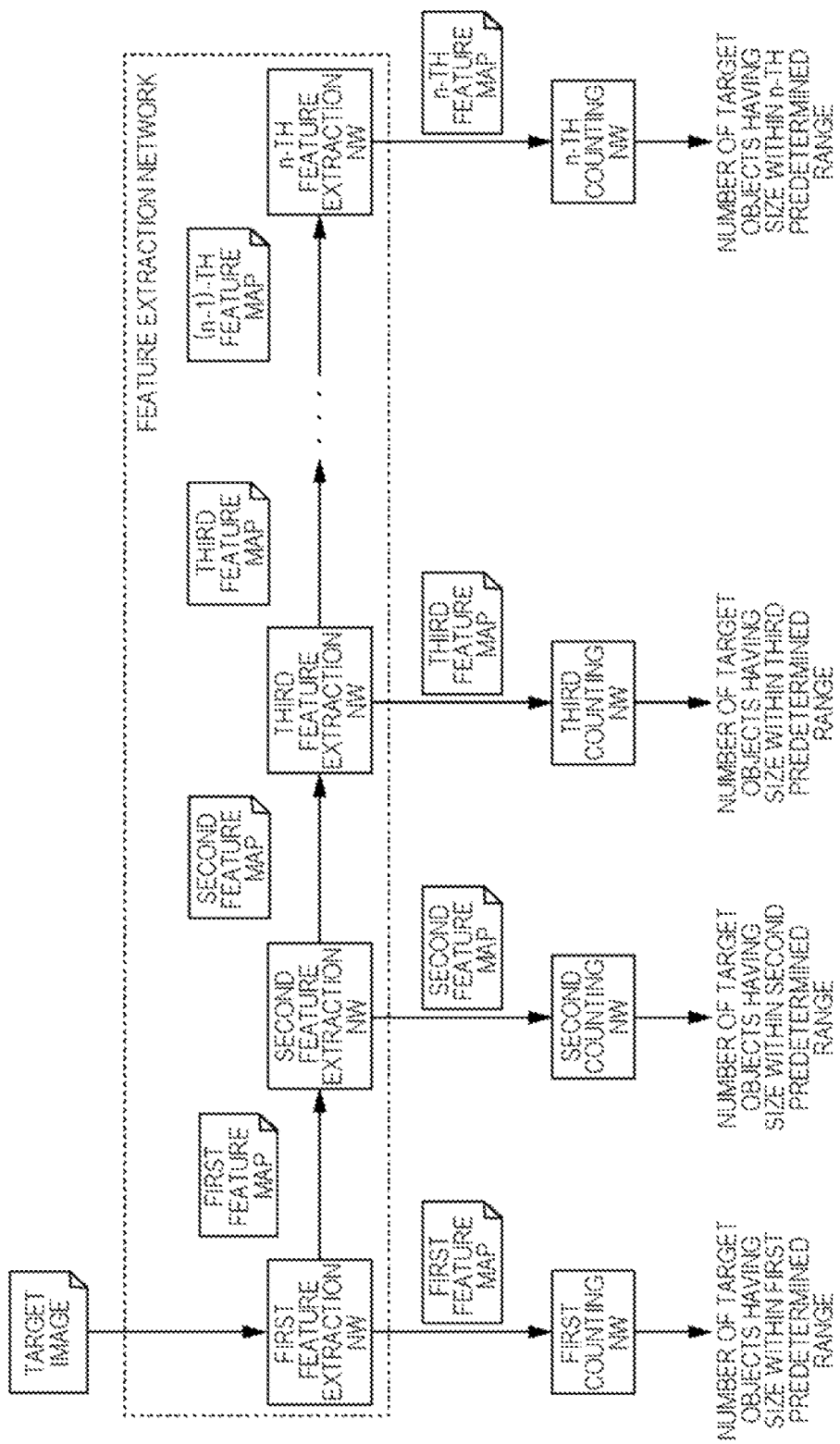
FIG. 6 is a diagram illustrating an object count estimation apparatus including n each of feature extraction networks and counting networks.

FIG. 6 is a diagram illustrating an object count estimation apparatus 2000 including n each of the feature extraction networks and the counting networks. An i-th feature extraction network generates an i-th feature map by performing convolution processing on an (i−1)-th feature map (where i is an integer equal to or greater than 1 and equal to or less than n). For example, a third feature extraction network generates a third feature map by performing convolution processing on a second feature map 30. Further, a fourth feature extraction network generates a fourth feature map by performing convolution processing on the third feature map. As indicated in a dotted frame in FIG. 6, a sequential connection of the first feature extraction network to the n-th feature extraction network can be viewed as one large feature extraction network.

A first feature map to an n-th feature map are input to the first counting network to the n-th counting network, respectively. The i-th counting network is configured to output the number of target objects having a size within an i-th predetermined range for an i-th estimation region included in a target image 10 (an image region on the target image 10 related to each cell in the i-th feature map) in response to input of the i-th feature map. Note that, the sizes of the first feature map to the n-th feature map satisfy a relation of "first feature map>second feature map> . . . >n-th feature map."

Information output by the object count estimation apparatus 2000, based on an output of each counting network, is similar to information output based on outputs of the aforementioned first counting network 2044 and the second counting network 2064.

Modified Example 1

Each network may be configured to count the number of target objects having different attributes. For example, it is assumed that a target object is a person and an age group is used as an attribute. Further, child and adult are assumed to be used as attribute values of the age group. In this case, the first counting network 2044 estimates each of the number of children and the number of adults. Specifically, a set of a first counting network 2044 undergoing learning in such a way as to count the number of children from a first feature map 20 and a second counting network 2064 undergoing learning in such a way as to count the number of children from a second feature map 30, and a set of a first counting network 2044 undergoing learning in such a way as to count the number of adults from the first feature map 20 and a second counting network 2064 undergoing learning in such a way as to count the number of adults from the second feature map 30 are provided.

However, the networks counting the numbers of target objects respectively having different attributes may be configured with a single network. In this case, for both the first counting network 2044 and the second counting network 2064, an output being the number for each attribute is provided in a channel direction being attribute. For example, the number of adults and the number of children are assumed to be counted. In this case, an output being the number of adults and an output being the number of children are provided in the channel direction in the first counting network 2044. The same applies to the second counting network 2064.

Various attributes may be employed as the attributes. For example, attributes related to an object such as direction, age, sex, and affiliation (such as a businessperson, a student, or a family) may be used as the attributes. In addition, for example, attributes of a structure constituted by an object, such as a queue state, a residence state, and a panic state may be used as the attributes.

The object count estimation apparatus 2000 in the modified example 1 can acquire the number of target objects having a size within the first predetermined range for each first estimation region and for each attribute. Similarly, the number of target objects having a size within the second predetermined range can be acquired for each second estimation region and each attribute.

Note that while the object count estimation apparatus 2000 is configured to count the numbers of target objects having different attributes in the above description, the apparatus may be configured to output the numbers of target objects and additionally compute the ratio between the numbers of target objects having different attributes.

Modified Example 2

The second feature extraction network 2062 may be configured to acquire a target image 10 instead of a first feature map 20. In this case, the second feature extraction network 2062 generates a second feature map 30 by performing convolution processing on the target image 10. In this case, the second feature map 30 is generated in such a way as to be smaller in size than a first feature map 20. For example, the number of convolutional layers included in the second feature extraction network 2062 is set to be larger than the number of convolutional layers included in the first feature extraction network 2042. The same applies to example embodiments to be described later.

Example Embodiment 2

Figure 7:
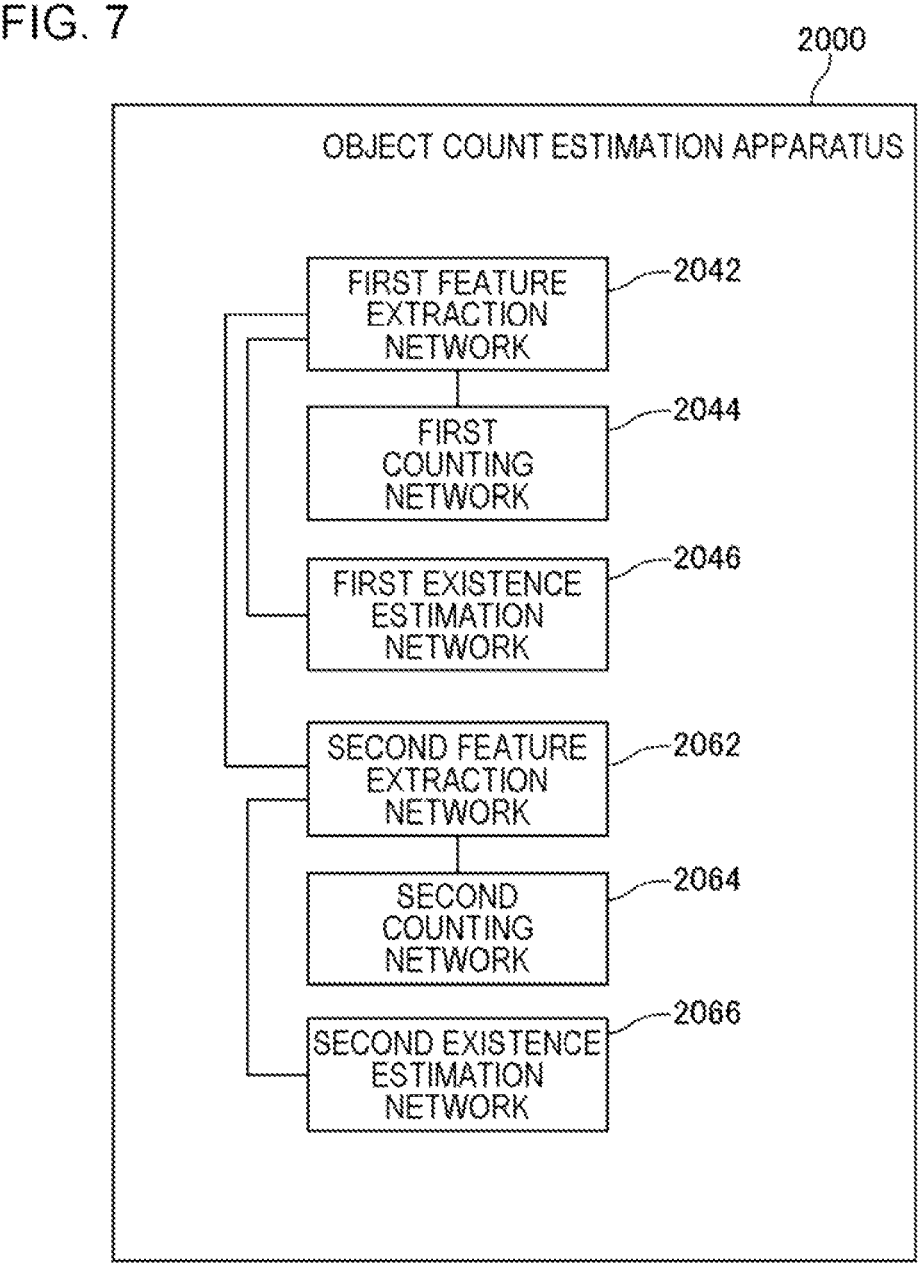
FIG. 7 is a block diagram illustrating a functional configuration of an object count estimation apparatus according to an example embodiment 2.

FIG. 7 is a block diagram illustrating a functional configuration of an object count estimation apparatus 2000 according to an example embodiment 2. The object count estimation apparatus 2000 according to the example embodiment 2 has functions similar to those of the object count estimation apparatus 2000 according to the example embodiment 1 except for a point described below.

The object count estimation apparatus 2000 according to the example embodiment 2 further includes a first existence estimation network 2046 and a second existence estimation network 2066. For example, each network is provided by a neural network such as a convolutional neural network.

The first existence estimation network 2046 acquires a first feature map 20 and, by using the first feature map 20, outputs a value related to existence of a target object having a size within a first predetermined range (hereinafter referred to as a first existence label) for each first estimation region in the target image 10 (an image region on the target image 10 related to each cell in the first feature map 20). For example, the first existence label indicates 1 when a target object having a size within the first predetermined range exists in a related first estimation region and indicates 0 when a target object having a size within the first predetermined range does not exist in the related first estimation region. In addition, for example, the first existence label may indicate an existence probability of a target object having a size within the first predetermined range for a related first estimation region.

Note that a first counting network 2044 and the first existence estimation network 2046 may be provided by a single network. For example, an output estimating a first existence label is added to the first counting network 2044 (such as adding an output in the channel direction). Thus, in response to input of a first feature map 20 to the first counting network 2044, each of the number of target objects having a size within the first predetermined range and a first existence label is output from the first counting network 2044.

Similarly, the second existence estimation network 2066 acquires a second feature map 30 and, by using the second feature map 30, outputs a value related to existence of a target object having a size within a second predetermined range (hereinafter referred to as a second existence label) for each second estimation region in the second feature map 30 (an image region on the target image 10 related to each cell in the second feature map 30). The meaning of a value indicated by a second existence label is similar to the meaning of a value indicated by a first existence label. Note that a second counting network 2064 and the second existence estimation network 2066 may also be provided by a single network.

For example, the object count estimation apparatus 2000 computes the number of target objects having a size within the first predetermined range for each first estimation region, based on outputs of the first counting network 2044 and the first existence estimation network 2046. For example, a first existence label is assumed to indicate existence of a target object. In this case, for each first estimation region, the object count estimation apparatus 2000 performs processing of "1) using the number of objects output by the first counting network 2044 as-is when existence of a target object is indicated by a first existence label and 2) setting the number of target objects to 0 when nonexistence of a target object is indicated by a first existence label." In other words, in a case that nonexistence of a target object is indicated by a first existence label (a case of first existence label=0) for a certain first estimation region, the number of target objects output from the first counting network 2044 is not reflected in the number of target objects output from the object count estimation apparatus 2000 even when the number of target objects is greater than 0. The reason is that when outputs of the first counting network 2044 and outputs of the first existence estimation network 2046 are respectively viewed as matrices, the above operation corresponds to computing element-by-element products for the matrices.

In addition, for example, a first existence label is assumed to represent an existence probability of a target object. In this case, the object count estimation apparatus 2000 performs processing of "1) using the number of objects output by the first counting network 2044 as-is when a first existence label indicates an existence probability equal to or greater than a threshold value and 2) setting the number of target objects to 0 when a first existence label indicates an existence probability less than the threshold value" for each first estimation region. In other words, in a case that a first existence label indicates an existence probability of a target object being less than the threshold value (first existence label<threshold value) for a certain first estimation region, the number of target objects output from the first counting network 2044 is not reflected in the number of target objects output from the object count estimation apparatus 2000 even when the number of target objects is greater than 0. The reason is that when outputs of the first counting network 2044 and outputs of the first existence estimation network 2046 are respectively viewed as matrices, the above operation corresponds to binarizing each element in the matrix output from the first existence estimation network 2046 and then computing the aforementioned element-by-element products.

Figure 8:
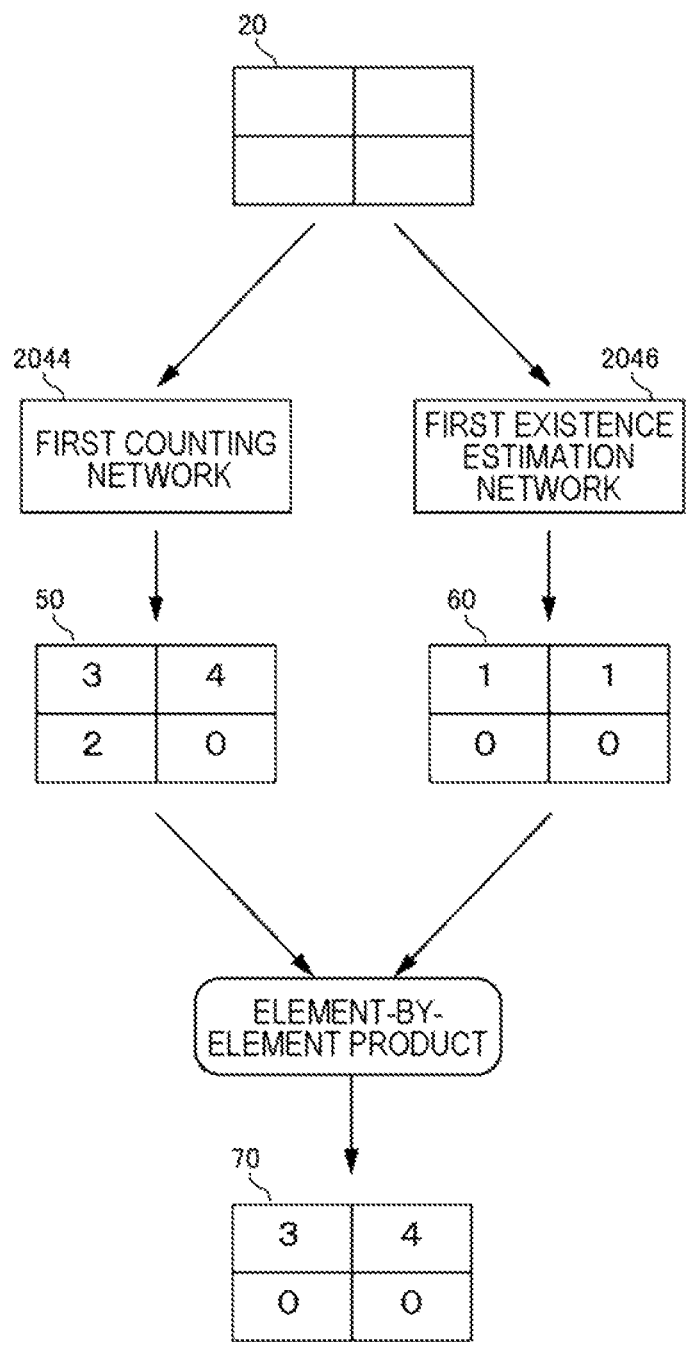
FIG. 8 is a diagram illustrating a method for computing the number of target objects having a size within a first predetermined range, based on an output of a first counting network and an output of a first existence estimation network.

FIG. 8 is a diagram illustrating a method for computing the number of target objects having a size within the first predetermined range, based on an output of the first counting network 2044 and an output of the first existence estimation network 2046. A map 50 indicates a value (the number of target objects having a size within the first predetermined range) output by the first counting network 2044 for each first estimation region. On the other hand, a map 60 indicates a value (existence of a target object having a size within the first predetermined range) output by the first existence estimation network 2046 for each first estimation region.

When a first existence label indicates existence of an object, the object count estimation apparatus 2000 generates a map 70 by computing element-by-element products for the map 50 and the map 60 and handles the generated map 70 as information indicating the number of target objects having a size within the first predetermined range for each first estimation region. When a first existence label indicates an existence probability of an object, the object count estimation apparatus 2000 generates a map 70 after binarizing each element in the map 60, based on a threshold value.

Note that information acquired from the first counting network 2044 (such as the aforementioned map 50) and information acquired from the first existence estimation network 2046 (such as the aforementioned map 60) may be output separately.

By performing similar processing by using an output of the second counting network 2064 and an output of the second existence estimation network 2066, the object count estimation apparatus 2000 computes the number of target objects having a size within the second predetermined range for each second estimation region. Information acquired from the second counting network 2064 and information acquired from the second existence estimation network 2066 may also be output separately.

In the object count estimation apparatus 2000 according to the present example embodiment, an existence estimation network estimating existence of a target object for an estimation region related to each cell in a feature map is provided in addition to a counting network counting target objects for an estimation region related to each cell in the feature map. The counting network and the existence estimation network use an output from a common feature extraction network. Therefore, as will be described later, learning of the counting network and learning of the existence estimation network are performed while mutually enhancing precision of the other. Therefore, by using both the counting network and the existence estimation network, the number of target objects can be more precisely estimated compared with a case of solely using the counting network. Further, by being used with the counting network, the existence estimation network can improve estimation precision of a value related to existence of a target object compared with a case of being singly provided.

Furthermore, as described above, the object count estimation apparatus 2000 may compute the number of target objects by using output results of both the counting network and the existence estimation network. Thus, by using both the counting network and the existence estimation network, the number of target objects can be more precisely estimated compared with a case of solely using the counting network.

Note that the first existence estimation network 2046 previously undergoes learning in such a way as to output a first existence label for each first estimation region in response to input of a first feature map 20. Similarly, the second existence estimation network 2066 previously undergoes learning in such a way as to output a second existence label for each second estimation region in response to input of a second feature map 30. A specific learning method of the first existence estimation network 2046 and the second existence estimation network 2066 will be described in an example embodiment to be described later.

Note that the object count estimation apparatus 2000 may include three or more each of the networks as described in the example embodiment 1. For example, the object count estimation apparatus 2000 may include n existence estimation networks from a first existence estimation network to an n-th existence estimation network.

Example of Hardware Configuration

The object count estimation apparatus 2000 according to the example embodiment 2 can be provided by various computers a configuration of each is illustrated in FIG. 4, similarly to the object count estimation apparatus 2000 according to the example embodiment 1. However, a storage device 1080 included in a computer 1000 providing the object count estimation apparatus 2000 according to the example embodiment 2 stores program modules providing the functional components in the object count estimation apparatus 2000 according to the example embodiment 2.

Modified Example

As described as a modified example of the example embodiment 1, the object count estimation apparatus 2000 according to the example embodiment 2 may be configured to count each of the numbers of target objects having different attributes. In this case, for each first estimation region, the first counting network 2044 estimates the number of target objects having a size within the first predetermined range for each attribute. In other words, the map 50 described in FIG. 8 is generated for each attribute. Then, for example, by applying a map indicating a first existence label for each first estimation region to a map 50 generated for each attribute, the object count estimation apparatus 2000 counts the number of target objects having a size within the first predetermined range for each attribute. In other words, by a common map 60 being applied to a map 50 for each attribute, the map 70 in FIG. 8 is generated for each attribute. The same applies to the number of target objects having a size within the second predetermined range.

A counting network counting target objects for each attribute and an existence estimation network may be configured with a single network. Specifically, an output estimating the number of target objects having a size within the first predetermined range is provided for each attribute in the first counting network 2044, and, in addition, an output estimating a first existence label is provided (in other words, the outputs are expanded in the channel direction as a network). The same applies to the second counting network 2064.

The object count estimation apparatus 2000 may be configured to estimate an existence label for each attribute. Specifically, not only the map 50 in FIG. 8 but also the map 60 in FIG. 8 is generated for each attribute. Then, for each attribute, the object count estimation apparatus 2000 estimates the number of target objects having a size within the first predetermined range by using an output of the first counting network 2044 for the attribute and an output of the first existence estimation network 2046 for the attribute. In other words, with respect to the example in FIG. 8, processing of, for each attribute, "generating a map 70 for the attribute from a map 50 for the attribute and a map 60 for the attribute" is performed.

There are various methods for configuring the object count estimation apparatus 2000 to estimate a first existence label for each attribute. For example, the first existence estimation network 2046 is provided for each attribute. In addition, for example, by providing a plurality of outputs of the first existence estimation network 2046 in the channel direction being attribute, a first existence label for each attribute may be output from a single first existence estimation network 2046. In addition, for example, a plurality of outputs each estimating the number of target objects having a size within the first predetermined range and a plurality of outputs each estimating a first existence label may be provided in the channel direction being attribute in the first counting network 2044. In this case, the number of target objects having a size within the first predetermined range and a first existence label are output for each attribute from a single network. The same applies to the method for estimating a second existence label for each attribute.

Note that, various attributes described in the example embodiment 1 may be employed as the attributes.

Example Embodiment 3

Figure 9:
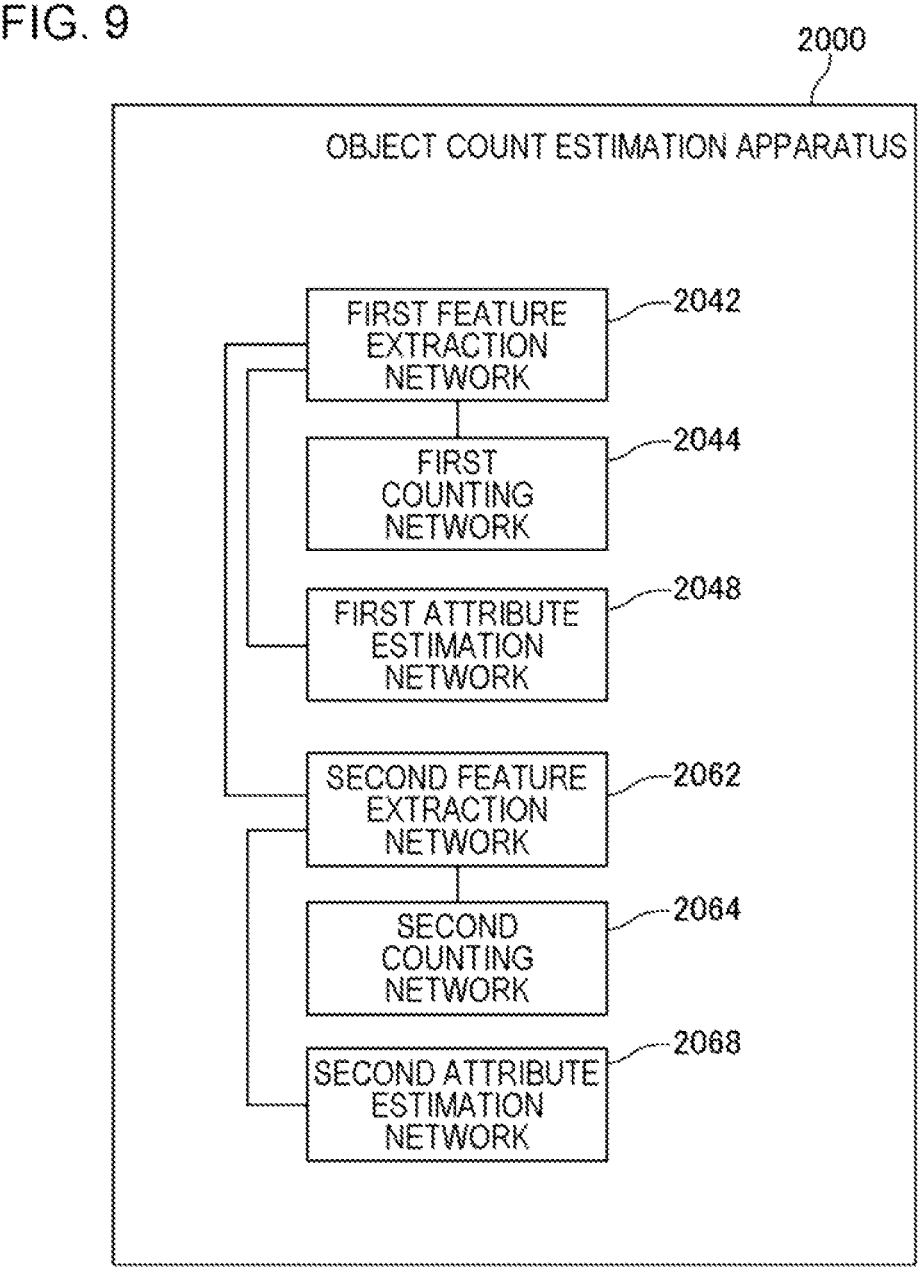
FIG. 9 is a block diagram illustrating a functional configuration of an object count estimation apparatus 2000 according to an example embodiment 3.

FIG. 9 is a block diagram illustrating a functional configuration of an object count estimation apparatus 2000 according to an example embodiment 3. The object count estimation apparatus 2000 according to the example embodiment 3 has functions similar to those of the object count estimation apparatus 2000 according to the example embodiment 1 or 2 except for a point described below.

The object count estimation apparatus 2000 according to the example embodiment 3 further includes a first attribute estimation network 2048 and a second attribute estimation network 2068. For example, each network is provided by a neural network such as a convolutional neural network.

The first attribute estimation network 2048 acquires a first feature map 20 and, by using the first feature map 20, outputs information about an attribute of a target object having a size within a first predetermined range (hereinafter referred to as first attribute information) for each first estimation region in a target image 10 (an image region on the target image 10 related to each cell in the first feature map 20). The aforementioned various attributes may be employed as attributes of a target object.

For example, any information (such as a statistic) that can integrate attributes of target objects having a size within the first predetermined range for a related first estimation region may be set as first attribute information. For example, first attribute information represents a class value (identifier) of the most dominant attribute out of attributes of each target object having a size within the first predetermined range in a related first estimation region. For example, the most dominant attribute refers to an attribute for which the number of target objects having the attribute is maximum or an attribute for which the area of a region occupied by target objects having the attribute is maximum.

In this case, the first attribute estimation network 2048 is configured as a network performing classification. Specifically, for each first estimation region, the first attribute estimation network 2048 outputs a class value representing attributes of the first estimation region.

The weighted mean or the like of attributes of each target object having a size within the first predetermined range in a related first estimation region may be handled as another example of first attribute information. The number or an area of target objects may be used as a weight. In this case, the first attribute estimation network 2048 is provided as a regression network.

The second attribute estimation network 2068 acquires a second feature map 30 and, by using the second feature map 30, outputs information about an attribute of a target object having a size within a second predetermined range (hereinafter referred to as second attribute information) for each second estimation region in a target image 10 (an image region on the target image 10 related to each cell in the second feature map 30). A type of information indicated by second attribute information is similar to a type of information indicated by first attribute information.

The object count estimation apparatus 2000 according to the example embodiment 3 outputs information about an attribute acquired from the first attribute estimation network 2048, in addition to information described in the example embodiment 1 and the example embodiment 2. For example, the first attribute estimation network 2048 outputs first attribute information acquired for each first estimation region. In addition, for example, the first attribute estimation network 2048 may output information acquired by appropriately processing first attribute information (such as a histogram of attributes included in an entire target image 10). The same applies to information about an attribute acquired from the second attribute estimation network 2068.

In the object count estimation apparatus 2000 according to the present example embodiment, an attribute estimation network estimating an attribute of a target object for an estimation region related to each cell in a feature map is provided in addition to a counting network counting target objects for an estimation region related to each cell in the feature map. The counting network and the attribute estimation network use an output from a common feature extraction network. Therefore, as will be described later, learning of the counting network and learning of the attribute estimation network are performed while mutually enhancing precision of the other. Therefore, by using both the counting network and the attribute estimation network, the number of target objects can be more precisely estimated compared with a case of solely using the counting network. Further, by being used with the counting network, the attribute network improves estimation precision of an attribute.

Note that the first attribute estimation network 2048 previously undergoes learning in such a way as to output first attribute information for each first estimation region in response to input of a first feature map 20. Similarly, the second attribute estimation network 2068 previously undergoes learning in such a way as to output second attribute information for each second estimation region in response to input of a second feature map 30. A specific learning method of the first attribute estimation network 2048 and the second attribute estimation network 2068 will be described in an example embodiment to be described later.

Note that the object count estimation apparatus 2000 may include three or more each of the networks as described in the example embodiment 1. For example, the object count estimation apparatus 2000 may include n existence estimation networks from a first existence estimation network to an n-th existence estimation network.

The counting network and the attribute estimation network may be provided by a single network. For example, an output estimating an attribute of a target object is added to the first counting network 2044 in a channel direction. Thus, both the number of target objects having a size within the first predetermined range and an attribute of a target object having a size within the first predetermined range are output from the first counting network 2044 in response to input of a first feature map 20 to the first counting network 2044. The same applies to the second counting network 2064.

Example of Hardware Configuration

The object count estimation apparatus 2000 according to the example embodiment 3 can be provided by various computers a configuration of each is illustrated in FIG. 4, similarly to the object count estimation apparatus 2000 according to the example embodiment 1. However, a storage device 1080 included in a computer 1000 providing the object count estimation apparatus 2000 according to the example embodiment 3 stores program modules providing the functional components in the object count estimation apparatus 2000 according to the example embodiment 3.

Modified Example

The object count estimation apparatus 2000 according to the example embodiment 3 may further include the first existence estimation network 2046 and the second existence estimation network 2066 described in the example embodiment 2. Operations of the second counting network 2064 and the second existence estimation network 2066 are as described in the example embodiment 2.

An existence estimation network and an attribute estimation network also use a common feature extraction network. Therefore, learning of the existence estimation network and learning of the attribute estimation network are also performed while mutually enhancing precision of the other. Accordingly, by further providing the existence estimation networks, estimation precision of the number of target objects and an attribute can be further improved.

A counting network, an existence estimation network, and an attribute estimation network may be provided by a single network. For example, an output estimating a first existence label and an output estimating first attribute information are added to the first counting network 2044. Thus, in response to input of a first feature map 20 to the first counting network 2044, the number of target objects having a size within the first predetermined range, a first existence label, and first attribute information are individually output from the first counting network 2044 in the channel direction. The same applies to the second counting network 2064.

Further, the object count estimation apparatus 2000 according to the example embodiment 3 may be configured to include the first existence estimation network 2046 and the second existence estimation network 2066 without including the first counting network 2044 and the second counting network 2064. In this case, counting of target objects is not performed, and estimation of existence or an existence probability of a target object, and estimation of an attribute of a target object are performed.

Thus, even in the case of a counting network not being provided, learning of an existence estimation network and learning of an attribute estimation network are performed while mutually enhancing precision of the other, as described above. Therefore, estimation precision of existence or an existence probability of a target object, and an attribute can be improved, compared with a case of separately and independently providing the networks.

Note that an existence estimation network and an attribute estimation network may be configured with a single network. For example, an output estimating first attribute information is added to the first existence estimation network 2046. Thus, in response to input of a first feature map 20 to the first existence estimation network 2046, a first existence label and first attribute information are individually output from the first existence estimation network 2046 in the channel direction. The same applies to the second existence estimation network 2066.

Example Embodiment 4

Figure 10:
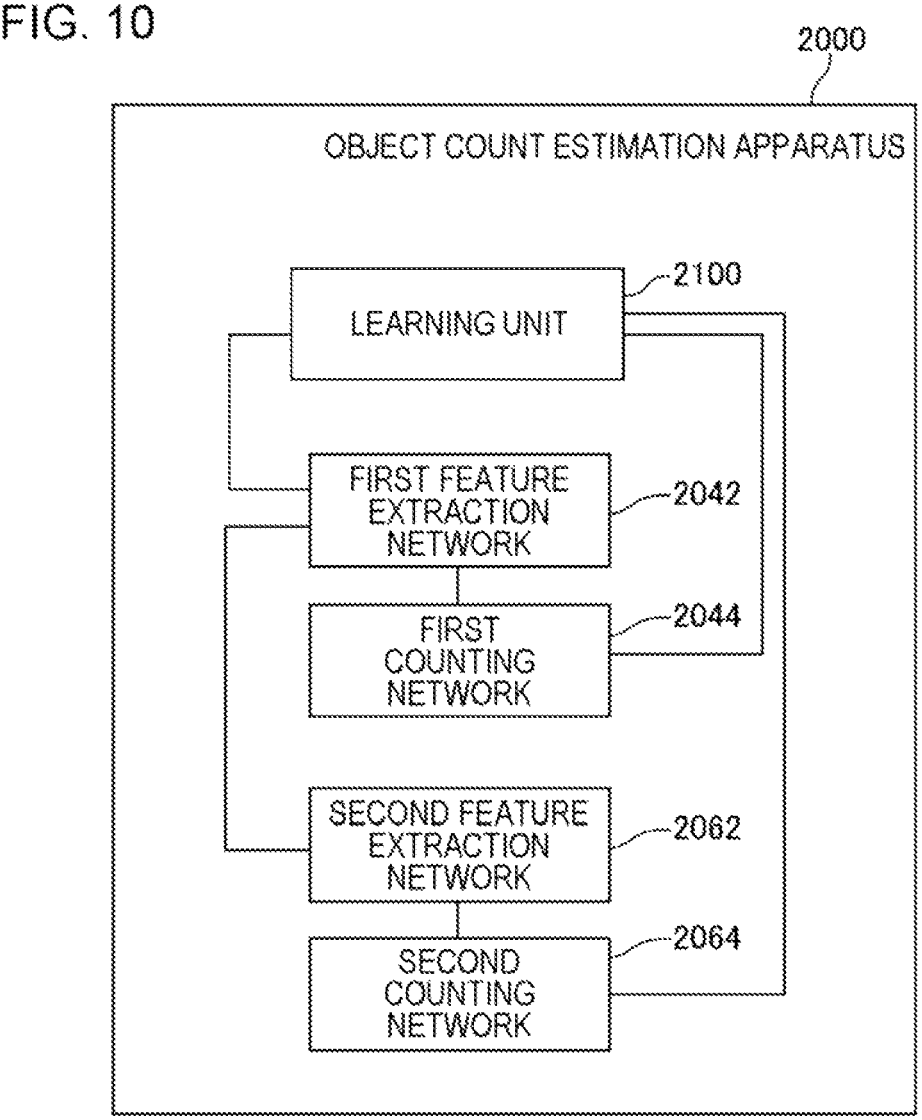
FIG. 10 is a block diagram illustrating a functional configuration of an object count estimation apparatus according to an example embodiment 4.

FIG. 10 is a block diagram illustrating a functional configuration of an object count estimation apparatus 2000 according to the example embodiment 4. The object count estimation apparatus 2000 according to the example embodiment 4 has functions similar to those of the object count estimation apparatus 2000 according to the example embodiment 1 except for a point described below.

The object count estimation apparatus 2000 according to the example embodiment 4 includes a learning unit 2100. The learning unit 2100 according to the example embodiment 4 performs learning of the networks included in the object count estimation apparatus 2000 according to the example embodiment 1 by using learning data. Note that an object count estimation apparatus 2000 performing learning on the first existence estimation network 2046 and the second existence estimation network 2066 additionally included in the object count estimation apparatus 2000 according to the example embodiment 2 will be described later as an example embodiment 5. Further, an object count estimation apparatus 2000 performing learning on the first attribute estimation network 2048 and the second attribute estimation network 2068 additionally included in the object count estimation apparatus 2000 according to the example embodiment 3 will be described later as an example embodiment 6.

In the object count estimation apparatus 2000 according to the example embodiment 4, the object count estimation apparatus 2000 acquires learning data. Then, by using the learning data, the learning unit 2100 performs learning of each network. The learning data include a learning image, a first correct answer object count map, and a second correct answer object count map. The learning image is an input image used for learning and is an image including a target object similarly to a target image 10.

The first correct answer object count map is learning data (training data) used for learning of a first counting network 2044. For example, a first correct answer object count map indicates the number of target objects having a size within a first predetermined range for each first estimation region (an image region related to each cell in a first feature map 20) included in a learning image. Similarly, the second correct answer object count map is learning data used for learning of a second counting network 2064. For example, a second correct answer object count map indicates the number of target objects having a size within a second predetermined range in each second estimation region (an image region related to each cell in a second feature map 30) included in a learning image.

An image and the number of target objects in an estimation region being such learning data represent an arrangement pattern of target objects in an estimation region related to a feature map. By thus using data causing learning of an arrangement pattern of target objects in an estimation region instead of data causing learning of the shapes of the target objects themselves, learning of overlapping of the target objects as-is can be performed, and learning of the network can be performed in such a way as to provide robustness to overlapping.

The learning unit 2100 inputs a learning image to a first feature extraction network 2042. In response to the input, the first feature extraction network 2042 generates a first feature map 20 for the learning image. Then, the first counting network 2044 outputs the number of target objects having a size within the first predetermined range for each first estimation region related to the first feature map 20 (an image region on the learning image related to a cell in the first feature map 20).

Further, in response to input of a first feature map 20 to a second feature extraction network 2062 from the first feature extraction network 2042, the second feature extraction network 2062 generates a second feature map 30. Further, the second counting network 2064 outputs the number of target objects having a size within the second predetermined range for each second estimation region related to the second feature map 30 (an image region on the learning image related to a cell in the second feature map 30).

For example, by using the number of target objects output by the first counting network 2044 for each first estimation region, the number of target objects output by the second counting network 2064 for each second estimation region, a first correct answer object count map, and a second correct answer object count map, the learning unit 2100 computes a loss representing an error between an output of a network and a correct answer value and performs learning of the network in such a way as to minimize the loss. The learning herein means update of each parameter in a network. Existing technologies such as back propagation can be used as learning of a network. Note that a computation formula of a loss (that is, a loss function) may be previously set in the learning unit 2100 or may be stored in a storage apparatus accessible from the learning unit 2100.

Networks used for counting target objects having a size within the first predetermined range (the first feature extraction network 2042 and the first counting network 2044) and networks used for counting target objects having a size within the second predetermined range (the first feature extraction network 2042, the second feature extraction network 2062, and the second counting network 2064) include the first feature extraction network 2042 in common. Therefore, parameters of the first feature extraction network 2042 are updated under the effect of both information back propagated from an output of the first counting network 2044 and information back propagated from an output of the second counting network 2064. For this reason, the networks used for counting target objects having a size within the first predetermined range and the networks used for counting target objects having a size within the second predetermined range undergo learning in such a way as to mutually enhance precision of the other, and therefore improvement of counting precision and improvement of learning speed can be achieved.

The learning unit 2100 repeatedly performs learning of each network by using each of a plurality of pieces of learning data. For example, the learning unit 2100 repeatedly performs learning of each network until magnitude of the aforementioned loss becomes a predetermined threshold value or less. In addition to the condition described above, any condition telling convergence of an error can be used as a condition for ending learning.

Note that when the number of target objects is small or when an arrangement of target objects is highly unbalanced in a learning image, many cells having the number of target objects included in a related estimation region being zero are generated in a feature map. In general, the number of cells in a feature map is greater than the number of target objects, and therefore such cells may be frequently generated. When an imbalance occurs in learning data as described above, learning may not properly progress. Then, in the aforementioned learning of minimizing an error, the learning unit 2100 may perform the learning in such a way as to minimize an error for a selected part of cells instead of using an error for all cells included in a feature map. At this time, it is preferable to select cells in such a way that the ratio in a correct answer object count map between the number of cells having the number of target objects in a related estimation region being zero and the number of the other cells is a predetermined ratio. Note that the predetermined ratio herein may be 1:1. In this case, the same number each of cells having the number of target objects being zero and the other cells are selected.

As described above, the object count estimation apparatus 2000 may include three or more each of feature extraction networks and counting networks. In this case, learning can also be achieved by a method similar to the method described above. For example, n each of feature extraction networks and counting networks are assumed to be provided. In this case, learning data include n correct answer object count maps from a first correct answer object count map to an n-th correct answer object count map.

The learning unit 2100 computes a loss representing an error between an output of a network and a correct answer value by using an output of each counting network and each correct answer object count map and performs learning of each network, based on the loss. Parameters of an i-th feature extraction network is updated under the effect of both information back propagated from an i-th counting network and information back propagated from an (i+1)-th feature extraction network [that is, information back propagated from an output of each of an (i+1)-th counting network to an n-th counting network]. With such a configuration, improvement of counting precision and improvement of learning speed of a network can be achieved.

Method for Generating Learning Data

Figure 12:
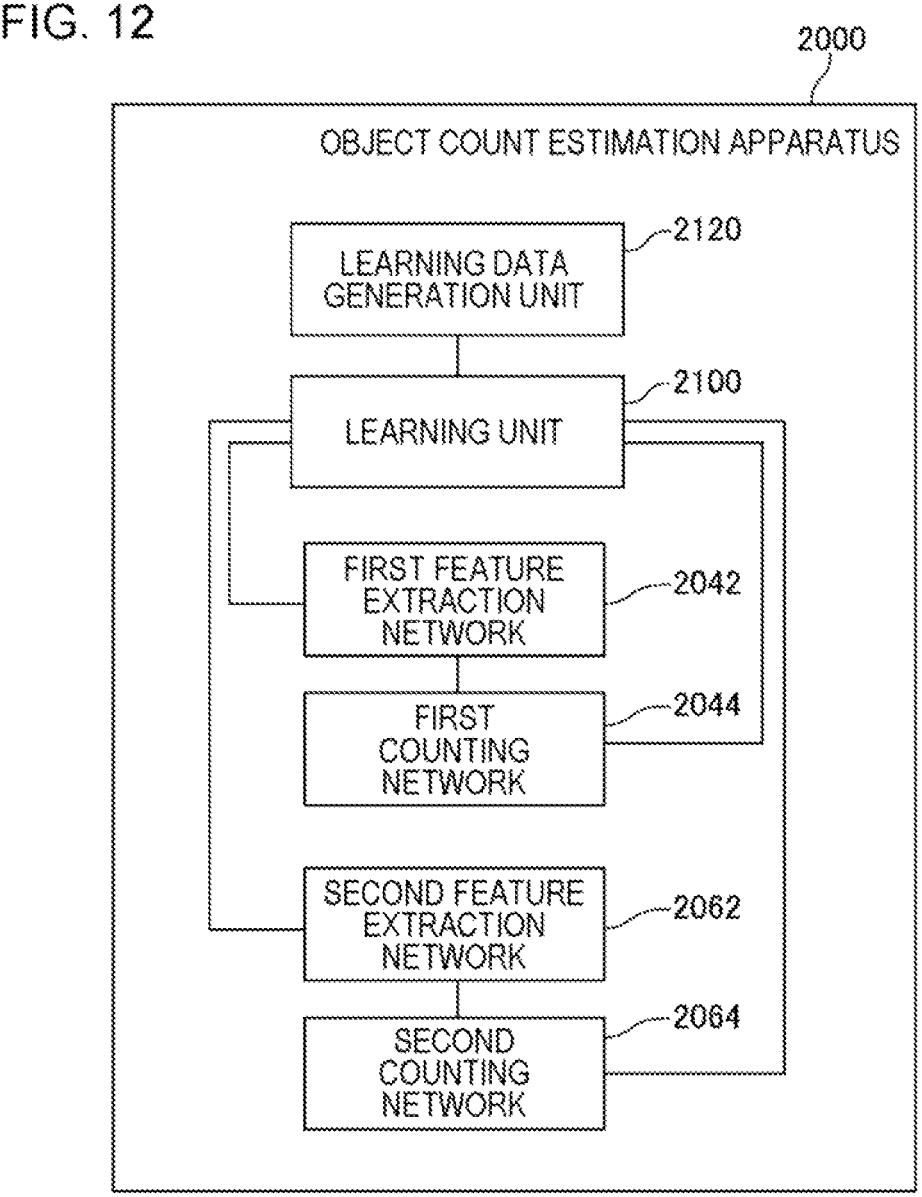
FIG. 12 is a block diagram illustrating a functional configuration of an object count estimation apparatus including a learning data generation unit.

A method for generating learning data will be exemplified. In the following example, part of generation of learning data is performed by the object count estimation apparatus 2000. A functional component generating learning data is referred to as a learning data generation unit 2120. FIG. 12 is a block diagram illustrating a functional configuration of an object count estimation apparatus 2000 including the learning data generation unit 2120.

For example, the learning data generation unit 2120 acquires a pair including a learning image and object information as data used for generation of learning data (learning data generation data). Object information is information allowing, for each target object included in a learning image, determination of the position and the size of the target object. For example, object information indicates, for each target object, an image region on a learning image representing the target object. It is assumed here that an image region representing a target object is represented by a rectangle circumscribed on the target object. In this case, for example, object information indicates, for each target object, coordinates of the top-left corner and the bottom-right corner of a rectangle circumscribed on the target object.

By using object information, the learning data generation unit 2120 generates a first correct answer object count map and a second correct answer object count map. In order to generate a first correct answer object count map, the learning data generation unit 2120 determines a target object having a size within the first predetermined range from target objects indicated by the object information. Note that since the object information includes, for each target object, information determining an image region representing the target object, the size of each target object can be recognized by using the information.

Furthermore, for each determined target object, the learning data generation unit 2120 determines a first estimation region to which the target object belongs. Based on the determination result, the learning data generation unit 2120 counts the number of target objects having a size within the first predetermined range for each first estimation region. Thus, information indicating the number of target objects having a size within the first predetermined range for each first estimation region, that is, a first correct answer object count map is generated.

An image region representing a target object may be positioned over a plurality of first estimation regions. In this case, for example, in order to avoid overlapping counting, the learning data generation unit 2120 determines one of the plurality of first estimation regions as a first estimation region to which the target object belongs. Then, for example, the learning data generation unit 2120 determines a first estimation region to which a predetermined ratio or greater of an image region representing a target object belongs as a first estimation region to which the target object belongs. In addition, for example, out of a plurality of first estimation regions including an image region representing a certain target object, the learning data generation unit 2120 determines a first estimation region including the most of the image region representing the target object as a first estimation region to which the target object belongs. For example, it is assumed that an image region representing a certain target object is positioned over three first estimation regions and that ⅔, ⅙, and ⅙ of the image region representing the target object are included in the first estimation regions, respectively. In this case, the first estimation region including ⅔ of the image region representing the target object is determined as a first estimation region representing the target object.

The learning data generation unit 2120 may determine a plurality of first estimation regions as first estimation regions including one target object. In this case, for example, as the number of target objects included in each estimation region, the learning data generation unit 2120 uses a ratio of an image region representing the target object included in the first estimation region. For example, it is assumed that a certain target object is positioned over two estimation regions and that ⅔ and ⅓ of an image region representing the target object are included in the estimation regions, respectively. In this case, the learning data generation unit 2120 counts target objects by a method of adding ⅔ to the number of target objects included in the former estimation region and adding ⅓ to the number of target objects included in the latter estimation region. Thus, a target object is counted as one object as a whole while being allowed to belong to a plurality of estimation regions, and therefore overlapping counting can be avoided.

The processing for avoiding overlapping counting of a target object described above is similarly applicable to processing of determining a second estimation region to which a target object having a size within the second predetermined range belongs, the processing being described later.

A second correct answer object count map can be similarly generated. Specifically, the learning data generation unit 2120 determines a target object having a size within the second predetermined range from target objects indicated by object information. Furthermore, for each determined target object, the learning data generation unit 2120 determines a second estimation region to which the target object belongs. Based on the determination result, the learning data generation unit 2120 counts the number of target objects having a size within the second predetermined range for each second estimation region. Thus, information indicating the number of target objects having a size within the second predetermined range for each second estimation region, that is, a second correct answer object count map is generated.

For example, the first predetermined range and the second predetermined range are defined based on the size of a related estimation region on an image. For example, a ratio between the size of an estimation region and a reference size of a target object to be counted by using a feature map related to the estimation region is predefined. In this case, a reference size of a target object to be counted by using a first feature map 20 (hereinafter referred to as a first reference size) can be computed by using the aforementioned ratio and the size of a first estimation region. Then, for example, the first predetermined range is defined as a range of the predetermined ratio to the computed first reference size. For example, the first predetermined range can be defined as "$a*T1 < k \leq b*T1$" by using the first reference size T1 and constants a and b (where $0<a<b$). Note that k denotes the size of a target object. Similarly, the second predetermined range can be defined as "$c*T2 < k \leq d*T2$" by using a second reference size T2 and constants c and d (where $0<c<d$).

The constants for defining the first predetermined range and the constants for defining the second predetermined range may be equal to each other or may be different. The former case means $a=c$ and $b=d$. Further, it is preferable that "$b*T1 = c*T2$" be satisfied in order to avoid a gap between the first predetermined range and the second predetermined range.

The method for generating a first correct answer object count map and a second correct answer object count map is not limited to the method described above. For example, an operator generating learning data may generate a first correct answer object count map and a second correct answer object count map by counting target objects through visual observation.

Note that when learning data are generated by an apparatus other than the object count estimation apparatus 2000, the object count estimation apparatus 2000 acquires learning data from the outside of the object count estimation apparatus 2000. For example, learning data are previously stored in a storage apparatus accessible from the object count estimation apparatus 2000. On the other hand, when learning data are generated by the object count estimation apparatus 2000, the object count estimation apparatus 2000 acquires learning data generated by the learning data generation unit 2120.

Example of Hardware Configuration

The object count estimation apparatus 2000 according to the example embodiment 4 can be provided by various computers a configuration of each is illustrated in FIG. 4, similarly to the object count estimation apparatus 2000 according to the example embodiment 1. However, a storage device 1080 included in a computer 1000 providing the object count estimation apparatus 2000 according to the example embodiment 4 stores program modules providing the functional components in the object count estimation apparatus 2000 according to the example embodiment 4.

Flow of Processing

Figure 11:
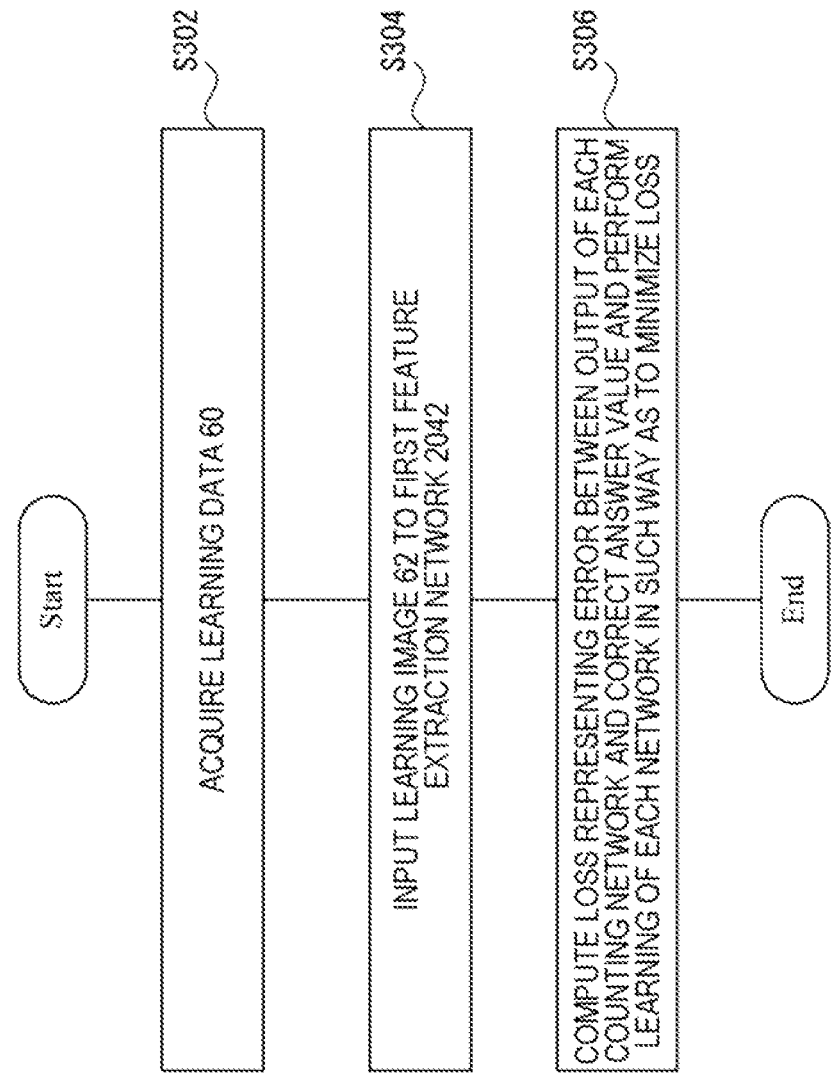
FIG. 11 is a flowchart illustrating a flow of processing executed by the object count estimation apparatus according to the example embodiment 4.

FIG. 11 is a flowchart illustrating a flow of processing executed by the object count estimation apparatus 2000 according to the example embodiment 4. The processing described in FIG. 12 is processing of performing learning by using a single piece of learning data. Learning by using a plurality of pieces of learning data is achieved by repeatedly executing the processing described in FIG. 11. FIG. 12.

The learning unit 2100 acquires learning data (S302). The learning unit 2100 inputs a learning image to the first feature extraction network 2042 (S304). The learning unit 2100 computes a loss representing an error between an output from each counting network and a correct answer value and performs learning of each network in such a way as to minimize the loss (S306).

Modified Example

As also described in a modified example of the example embodiment 1, each network may be configured to count the respective numbers of target objects having different attributes. In this case, object information in learning data generation data indicates, for each target object, an attribute of the target object in addition to the position and the size of the target object. The learning unit 2100 prepares learning data for each attribute and performs learning.

For example, it is assumed that a target object is a person and an age group is used as an attribute. Further, child and adult are used as two attribute values of the age group. In this case, a first correct answer object count map indicating the number of children having a size within a first predetermined range for each first estimation region and a first correct answer object count map indicating the number of adults having a size within the first predetermined range for each first estimation region are prepared. The same applies to a second correct answer object count map.

In order to perform learning of each network, the learning unit 2100 inputs a learning image to the first feature extraction network 2042. In response to the input, the number of target objects having a size within the first predetermined range is output from the first counting network 2044 for each attribute. Similarly, the number of target objects having a size within the second predetermined range is output from the second counting network 2064 for each attribute. The learning unit 2100 computes a loss representing an error between each output and a correct answer value (a first correct answer object count map for each attribute or a second correct answer object count map for each attribute) and updates parameters of each network in such a way as to minimize the loss.

Example Embodiment 5

Figure 13:
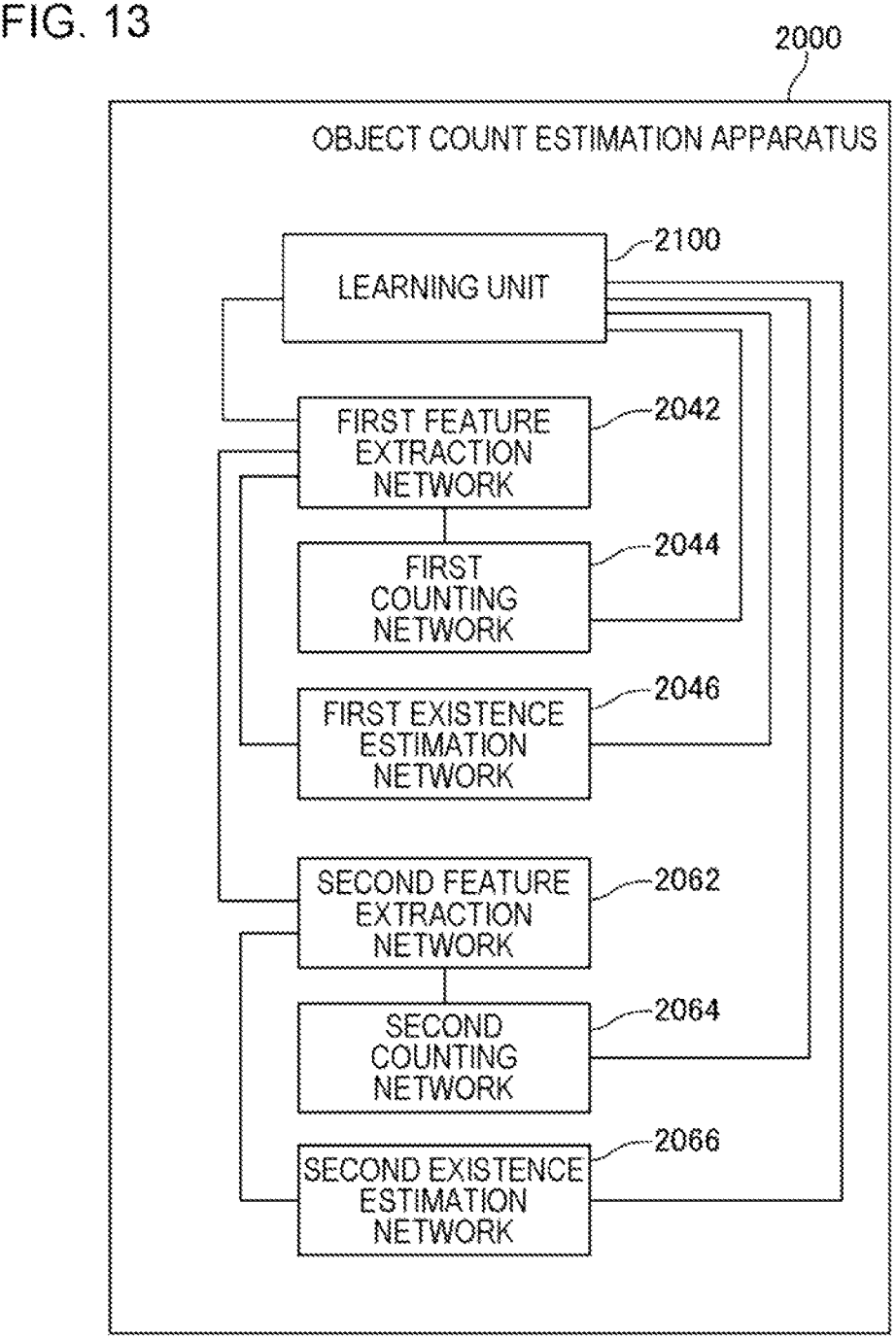
FIG. 13 is a block diagram illustrating a functional configuration of an object count estimation apparatus according to an example embodiment 5.

FIG. 13 is a block diagram illustrating a functional configuration of an object count estimation apparatus 2000 according to the example embodiment 5. The object count estimation apparatus 2000 according to the example embodiment 5 has functions similar to those of the object count estimation apparatus 2000 according to the example embodiment 4 except for a point described below.

The object count estimation apparatus 2000 according to the example embodiment 5 performs learning of each network, similarly to the object count estimation apparatus 2000 according to the example embodiment 4. However, as described above, the object count estimation apparatus 2000 according to the example embodiment 5 performs learning of the first existence estimation network 2046 and the second existence estimation network 2066 included in the object count estimation apparatus 2000 according to the example embodiment 2. In other words, a learning unit 2100 according to the example embodiment 5 further has a function of performing learning of the first existence estimation network 2046 and the second existence estimation network 2066.

Learning data acquired by the object count estimation apparatus 2000 according to the example embodiment 5 further include a first correct answer existence label map and a second correct answer existence label map. A first correct answer existence label map is learning data (training data) used for learning of the first existence estimation network 2046. Specifically, a first correct answer existence label map indicates a label representing existence of a target object having a size within a first predetermined range (that is, a first existence label being a correct answer) for each first estimation region included in a learning image. For example, a first correct answer existence label map indicates 1 for a first estimation region in which one or more target objects having a size within the first predetermined range exist and indicates 0 for a first estimation region in which no target object having a size within the first predetermined range exists.

On the other hand, a second correct answer existence label map is learning data used for learning of the second existence estimation network 2066. Specifically, a second correct answer existence label map indicates a label representing existence of a target object having a size within a second predetermined range (that is, a second existence label being a correct answer) for each second estimation region included in a learning image. For example, a second correct answer existence label map indicates 1 for a second estimation region in which one or more target objects having a size within the second predetermined range exist and indicates 0 for a second estimation region in which no target object having a size within the second predetermined range exists.

In order to perform learning of each network, the learning unit 2100 inputs a learning image to a first feature extraction network 2042. The learning unit 2100 computes a loss representing an error between an output from each of a first counting network 2044, a second counting network 2064, the first existence estimation network 2046, and the second existence estimation network 2066, and a correct answer value (a first correct answer object count map, a second correct answer object count map, a first correct answer existence label map, or a second correct answer existence label map) and updates parameters of each network in such a way as to minimize the computed loss. The existence probability of a target object indicated by the first correct answer existence label map can be handled in such a way that the probability is set to 100% for a first estimation region for which existence of the target object is indicated and 0% for a first estimation region for which nonexistence of the target object is indicated. Further, when an existence label represents existence of a target object, it is preferable to use, in learning, the existence probability of the object computed in a preceding stage in place of a final output of the existence estimation network.

The parameters of the first feature extraction network 2042 undergo learning under the effect of information back propagated from an output of each of the first counting network 2044, the second counting network 2064, the first existence estimation network 2046, and the second existence estimation network 2066. Further, the parameters of a second feature extraction network 2062 are updated under the effect of information back propagated from an output of each of the second counting network 2064 and the second existence estimation network 2066. Therefore, estimation precision and learning speed of a counting network can be improved compared with a case of the counting network being independently provided. Further, estimation precision and learning precision of an existence estimation network can be improved compared with a case of the existence estimation network being independently provided.

Note that it has been described in the example embodiment 4 that, in consideration of cases such as a large imbalance in an arrangement of target objects on a learning image, learning may be performed in such a way as to minimize an error for a selected part of cells instead of using an error for all cells included in a feature map. The same applies to learning of the existence estimation networks.

For example, learning is performed in such a way that cells are selected in such a way that the number of cells for which nonexistence or an existence probability less than a threshold value is indicated is equal to the number of the other cells in a correct answer existence label map and that a loss is computed by solely using the selected cells. In addition, for example, learning may be performed in such a way that cells are selected in such a way that the number of cells for which nonexistence or an existence probability less than a threshold value is indicated is a predetermined multiple of the number of cells in a correct answer existence label map and that a loss is computed by solely using the selected cells.

Further, in learning of a counting network (learning of a network other than an existence estimation network), learning may be performed in such a way that cells for which existence or an existent probability equal to or greater than a threshold value is indicated in a correct answer existence label map are selected and that a loss is computed by solely using the selected cells.

As described above, the object count estimation apparatus 2000 may include three or more each of the feature extraction networks and the like. In this case, learning can be achieved also by a method similar to the method described above. For example, n each of the feature extraction networks and the like are assumed to be provided. In this case, learning data include n correct answer object count maps from a first correct answer object count map to an n-th correct answer object count map and n correct answer existence label maps from a first correct answer existence label map to an n-th correct answer existence label map.

The learning unit 2100 computes a loss representing an error between an output from each of the counting networks and the existence estimation networks, and a correct answer value (one of the first correct answer object count map to the n-th correct answer object count map and the first correct answer existence label map to the n-th correct answer existence label map) and updates the parameters of each network in such a way as to minimize the computed loss.

Method for Generating Learning Data

A method for generating a first correct answer existence label map and a second correct answer existence label map will be described. When generating learning data in the object count estimation apparatus 2000, the object count estimation apparatus 2000 according to the present example embodiment also includes a learning data generation unit 2120 similarly to the object count estimation apparatus 2000 according to the example embodiment 4 illustrated in FIG. 12. For example, the learning data generation unit 2120 acquires a pair including a learning image and object information as data used for generation of learning data (learning data generation data). Then, the learning data generation unit 2120 generates a first correct answer object count map and generates a first correct answer existence label map by transforming the first correct answer object count map in accordance with a predetermined rule. Specifically, a first correct answer existence label map can be generated by transforming each cell in the first correct answer object count map in such a way that a cell having the number of target objects being 0 remains 0 (no target object exists) and a cell having the number of target objects equal to or greater than 1 is set to 1 (a target object exists). Note that the method for generating a first correct answer object count map is as described in the example embodiment 4.

Note that a cell in a first correct answer object count map may indicate a value greater than 0 and less than 1. For example, a case that an image region representing a certain target object is positioned over two estimation regions as described in the example embodiment 4 applies. In this case, for example, the learning data generation unit 2120 generates a first correct answer existence label map by transforming each cell in the first correct answer object count map in such a way that a cell having the number of target objects equal to or less than a threshold value Th ($0 < \text{Th} \le 1$) is set to 0 and a cell having the number of target objects greater than the threshold value Th is set to 1.

Furthermore, the learning data generation unit 2120 generates a second correct answer existence label map by transforming a second correct answer object count map in accordance with a similar rule.

The method for generating a first correct answer existence label map and a second correct answer existence label map is not limited to the method described above. For example, an operator generating learning data may manually generate a first correct answer existence label map and a second correct answer existence label map.

Example of Hardware Configuration

The object count estimation apparatus 2000 according to the example embodiment 5 can be provided by various computers a configuration of each is illustrated in FIG. 4, similarly to the object count estimation apparatus 2000 according to the example embodiment 1. However, a storage device 1080 included in a computer 1000 providing the object count estimation apparatus 2000 according to the example embodiment 5 stores program modules providing the functional components in the object count estimation apparatus 2000 according to the example embodiment 5.

Modified Example

As described as the modified example of the example embodiment 2, the object count estimation apparatus 2000 may include a counting network counting the number of target objects for each attribute and an existence estimation network. In this case, object information in learning data generation data indicates an attribute of each target object in addition to the position and the size of the target object, and by a method similar to the method described in the modified example of the example embodiment 4, the learning unit 2100 prepares learning data for each attribute and performs learning.

For example, it is assumed that a target object is a person and an age group is used as an attribute. Further, it is assumed that child and adult are used as two attribute values of the age group. In this case, the first counting network 2044 outputs each of the number of adults having a size within the first predetermined range and the number of children having a size within the first predetermined range. Further, the second counting network 2064 outputs each of the number of adults having a size within the second predetermined range and number of children having a size within the second predetermined range. Furthermore, the first existence estimation network 2046 and the second existence estimation network 2066 output a first existence label and a second existence label, respectively.

The learning unit 2100 in the modified example of the example embodiment 4 computes a loss representing an error between each of the aforementioned outputs and a correct answer value (a first correct answer object count map for each attribute, a second correct answer object count map for each attribute, a first correct answer existence label map, or a second correct answer existence label map) and updates parameters of each network in such a way as to minimize the computed loss.

Note that an existence label may be estimated for each attribute, as described in the modified example of the example embodiment 2. In this case, a correct answer existence label map is also prepared for each attribute. The learning unit 2100 computes a loss representing an error between an output from each of the first counting network 2044, the second counting network 2064, the first existence estimation network 2046, and the second existence estimation network 2066 for each attribute and a correct answer value (a first correct answer object count map for each attribute, a second correct answer object count map for each attribute, a first correct answer existence label map for each attribute, or a second correct answer existence label map for each attribute) and updates parameters of each network in such a way as to minimize the computed loss.

Example Embodiment 6

Figure 14:
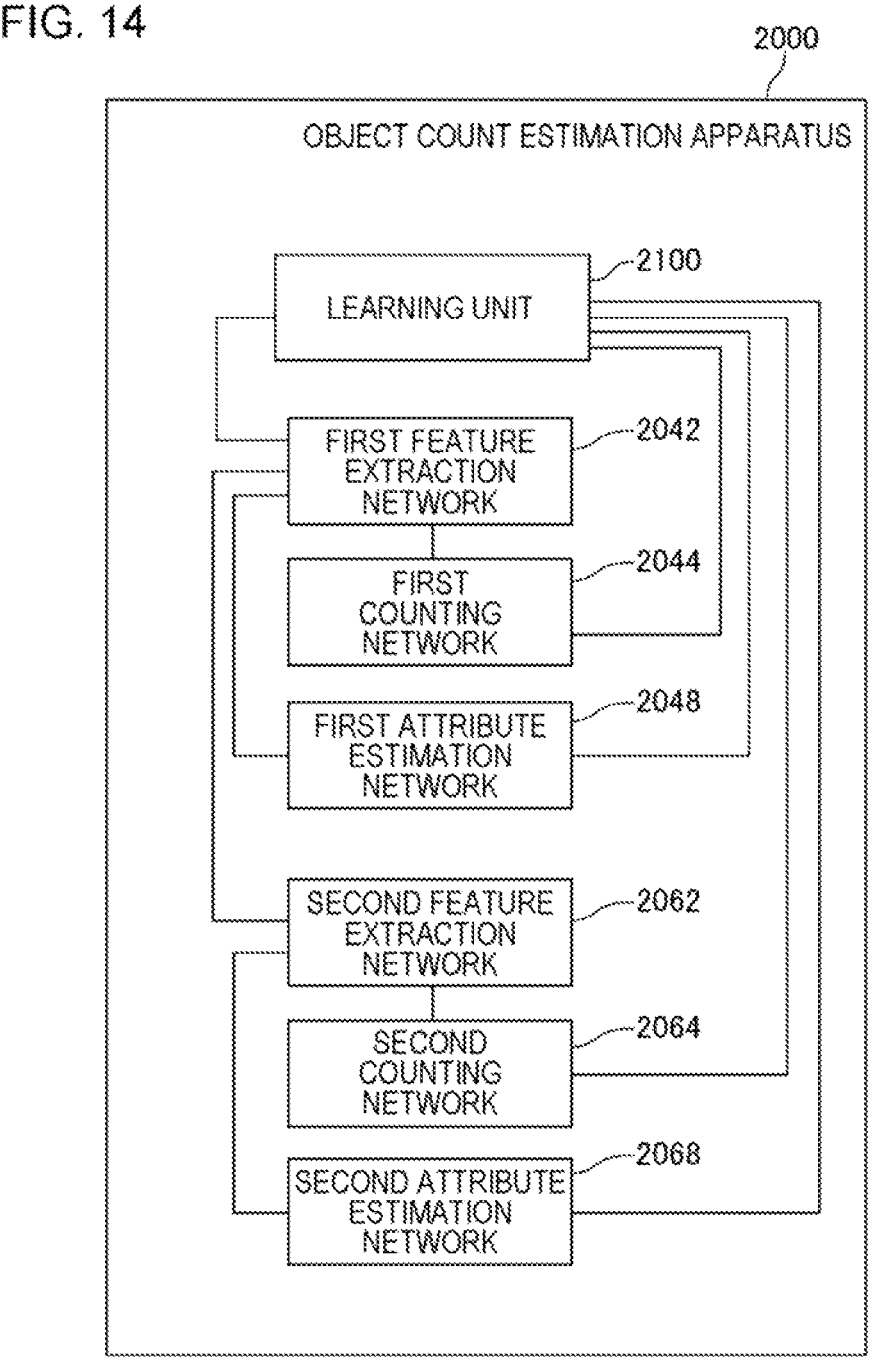
FIG. 14 is a block diagram illustrating a functional configuration of an object count estimation apparatus according to an example embodiment 6.

FIG. 14 is a block diagram illustrating a functional configuration of an object count estimation apparatus 2000 according to the example embodiment 6. The object count estimation apparatus 2000 according to the example embodiment 6 has functions similar to those of the object count estimation apparatus 2000 according to the example embodiment 4 or 5 except for a point described below.

The object count estimation apparatus 2000 according to the example embodiment 6 performs learning of each network similarly to the object count estimation apparatus 2000 according to the example embodiment 4 or 5. However, as described above, the object count estimation apparatus 2000 according to the example embodiment 6 performs learning of the first attribute estimation network 2048 and the second attribute estimation network 2068 included in the object count estimation apparatus 2000 according to the example embodiment 3. In other words, a learning unit 2100 according to the example embodiment 6 further has a function of performing learning of the first attribute estimation network 2048 and the second attribute estimation network 2068.

Learning data acquired by the object count estimation apparatus 2000 according to the example embodiment 6 further include a first correct answer attribute map and a second correct answer attribute map. A first correct answer attribute map is learning data used for learning of the first attribute estimation network 2048. Specifically, a first correct answer attribute map indicates attribute information of a target object having a size within a first predetermined range for each first estimation region included in a learning image. For example, for each first estimation region, a first correct answer attribute map indicates a class value of the most dominant attribute in the first estimation region or the weighted mean of class values or the like of attributes in the first estimation region.

On the other hand, a second correct answer attribute map is learning data used for learning of the second attribute estimation network 2068. Specifically, for each second estimation region included in a learning image, a second correct answer attribute map indicates attribute information of a target object having a size within a second predetermined range. The content of a second correct answer attribute map is similar to that of a first correct answer attribute map.

The learning unit 2100 inputs a learning image to a first feature extraction network 2042. In response to the input, the number of target objects having a size within the first predetermined range and the number of target objects having a size within the second predetermined range are output from a first counting network 2044 and a second counting network 2064, respectively, as described in the example embodiment 4 and the like. Further, attribute information of a target object having a size within the first predetermined range and attribute information of a target object having a size within the second predetermined range are further output from the first attribute estimation network 2048 and the second attribute estimation network 2068, respectively, according to the present example embodiment.

The learning unit 2100 computes a loss representing an error between an output from each of the aforementioned first counting network 2044, the second counting network 2064, the first attribute estimation network 2048, and the second attribute estimation network 2068, and a correct answer value (a first correct answer object count map, a second correct answer object count map, a first correct answer attribute map, or a second correct answer attribute map) and updates parameters of each network in such a way as to minimize the computed loss.

When the first attribute estimation network 2048 performs classification, it is preferable to perform learning, based not on the final output of the first attribute estimation network 2048 but on a probability for each attribute computed by the first attribute estimation network 2048 in a preceding stage. For example, the first attribute estimation network 2048 is configured to compute, for each first estimation region, a first vector listing, for each attribute, the probability of the attribute being the most dominant attribute and output a second vector acquired by 1-of-k vectorizing the vector. In this case, for example, data including, for each first estimation region, a 1-of-k vector indicating 1 only for the most dominant attribute are prepared as a first correct answer attribute map. The same applies to the second attribute estimation network 2068.

Estimation precision and learning speed of a counting network according to the present example embodiment are improved for a reason similar to the reason for improvement in estimation precision and learning speed of a counting network according to the example embodiment 5. Further, estimation precision and learning speed of an attribute estimation network are also improved compared with a case of singly providing an attribute estimation network.

As described above, the object count estimation apparatus 2000 may include three or more each of feature extraction networks and the like. In this case, learning can also be achieved by a method similar to the method described above. For example, n each of feature extraction networks and the like are assumed to be provided. In this case, learning data include n correct answer object count maps from a first correct answer object count map to an n-th correct answer object count map and n correct answer attribute maps from a first correct answer attribute map to an n-th correct answer attribute map.

The learning unit 2100 computes a loss representing an error between an output from each of the counting networks and attribute estimation networks, and a correct answer value (one of the first correct answer object count map to the n-th correct answer object count map and the first correct answer attribute map to the n-th correct answer attribute map) and updates parameters of each network in such a way as to minimize the computed loss.

Method for Generating Learning Data

A method for generating a first correct answer attribute map and a second correct answer attribute map will be described. When generating learning data in the object count estimation apparatus 2000, the object count estimation apparatus 2000 according to the present example embodiment also includes a learning data generation unit 2120, similarly to the object count estimation apparatus 2000 according to the example embodiment 4 illustrated in FIG. 14. For example, the learning data generation unit 2120 acquires a pair including a learning image and object information as data used for generation of learning data (learning data generation data), similarly to the object count estimation apparatus 2000 according to the example embodiment 4. However, object information according to the present example embodiment indicates, for each target object, an attribute of the target object in addition to the position and the size of the target object. By using the information, the learning data generation unit 2120 generates a first correct answer attribute map and a second correct answer attribute map.

For example, the learning data generation unit 2120 performs processing as follows. After acquiring a pair including a learning image and object information as described above, the learning data generation unit 2120 generates a first correct answer object count map described in the example embodiment 4. Each first estimation region to which each target object belongs is determined by the generation, as described in the example embodiment 4. Then, for each first estimation region, the learning data generation unit 2120 computes first attribute information of the first estimation region, based on an attribute of each target object belonging to the first estimation region. An attribute of a target object is indicated in object information of the target object. The learning data generation unit 2120 generates a first correct answer attribute map indicating the first attribute information computed for each first estimation region as described above.

For each first estimation region, the learning data generation unit 2120 generates first attribute information representing a statistic of attributes of target objects included in the first estimation region. For example, for each first estimation region, the learning data generation unit 2120 computes, for each attribute, the number of target objects having the attribute and sets an attribute for which the number is maximum to first attribute information of the first estimation region. In addition, for example, for each first estimation region, the learning data generation unit 2120 computes, for each attribute, a weighted sum with the area of a target object as a weight and sets an attribute having the maximum weighted sum to first attribute information of the first estimation region. In addition, for example, for each first estimation region, the learning data generation unit 2120 computes a weighted mean of attributes with the number or the area of target objects as a weight and sets the weighted mean to first attribute information of the first estimation region.

Similarly, the learning data generation unit 2120 computes second attribute information for each second estimation region and generates a second correct answer attribute map indicating the second attribute information for each second estimation region.

The method for generating a first correct answer attribute map and a second correct answer attribute map is not limited to the method described above. For example, an operator generating learning data may manually generate a first correct answer attribute map and a second correct answer attribute map.

Example of Hardware Configuration

The object count estimation apparatus 2000 according to the example embodiment 6 can be provided by various computers a configuration of each is illustrated in FIG. 4, similarly to the object count estimation apparatus 2000 according to the example embodiment 1. However, a storage device 1080 included in a computer 1000 providing the object count estimation apparatus 2000 according to the example embodiment 6 stores program modules providing the functional components in the object count estimation apparatus 2000 according to the example embodiment 6.

While the example embodiments of the present invention have been described above with reference to the drawings, the drawings are exemplifications of the present invention, and configurations acquired by combining the configurations in the aforementioned example embodiments or various configurations other than those described above may be employed.

The example embodiments described above may also be described in part or in whole as the following supplementary notes but are not limited thereto.

1. An object count estimation apparatus including:
   a feature extraction network generating a first feature map and a second feature map by performing convolution processing on a target image;
   a first counting network estimating, for each cell in the first feature map, a number of a target object having a size within a first predetermined range for a first estimation region being an image region in the target image related to the cell; and
   a second counting network estimating, for each cell in the second feature map, a number of a target object having a size within a second predetermined range for a second estimation region being an image region in the target image related to the cell, wherein
   a size of the first feature map is larger than a size of the second feature map, and
   a size included in the first predetermined range is smaller than a size included in the second predetermined range.

2. The object count estimation apparatus according to 1., wherein
   the feature extraction network generates the first feature map by performing convolution processing on the target image and generates the second feature map by further performing convolution processing on the first feature map.

3. The object count estimation apparatus according to 1, or 2., wherein
   the first counting network estimates a number of a target object having a size within a first predetermined range for each attribute of a target object, and
   the second counting network estimates a number of a target object having a size within a second predetermined range for each attribute of a target object.

4. The object count estimation apparatus according to any one of 1. to 3., further including:
   a first existence estimation network estimating existence of a target object having a size within the first predetermined range for the first estimation region related to each cell in the first feature map; and
   a second existence estimation network estimating existence of a target object having a size within the second predetermined range for the second estimation region related to each cell in the second feature map.

5. The object count estimation apparatus according to 4., wherein,
   for a first estimation region for which existence of the target object or an existence probability of the target object being equal to or greater than a threshold value is estimated by the first existence estimation network, a number estimated by the first existence estimation network is used as a number of the target object in the first estimation region,
   for a first estimation region for which nonexistence of the target object or an existence probability of the target object being less than a threshold value is estimated by the first existence estimation network, a number of the target object in the first estimation region is set to zero,
   for a second estimation region for which existence of the target object or an existence probability of the target object being equal to or greater than a threshold value is estimated by the second existence estimation network, a number estimated by the second existence estimation network is used as a number of the target object in the second estimation region, and,
   for a second estimation region for which nonexistence of the target object or an existence probability of the target object being less than a threshold value is estimated by the second existence estimation network, a number of the target object in the second estimation region is set to zero.

6. The object count estimation apparatus according to any one of 1. to 5., further including:
   a first attribute estimation network estimating an attribute of a target object having a size within the first predetermined range for the first estimation region related to each cell in the first feature map; and
   a second attribute estimation network estimating an attribute of a target object having a size within the second predetermined range for the second estimation region related to each cell in the second feature map.

7. The object count estimation apparatus according to any one of 1. to 6., further including
   a learning unit performing learning of a network by using learning data, wherein
   the learning data include a target image, first correct answer object count data indicating a number of a target object having a size within the first predetermined range for the each first estimation region in the target image, and second correct answer object count data indicating a number of a target object having a size within the second predetermined range for the each second estimation region in the target image, and
   the learning unit computes a loss by using the first correct answer object count data, the second correct answer object count data, and an output acquired from each of the first counting network and the second counting network by inputting the target image to the feature extraction network and based on the computed loss, performs learning of the feature extraction network, the first counting network, and the second counting network.

8. The object count estimation apparatus according to 7., wherein
   the first counting network estimates a number of a target object having a size within a first predetermined range for each attribute of a target object,
   the second counting network estimates a number of a target object having a size within a second predetermined range for each attribute of a target object, and
   the learning data
      further indicates an attribute of each target object included in the target image and
      indicates the first correct answer object count data and the second correct answer object count data for each attribute of the target object.

9. The object count estimation apparatus according to 7, or 8., further including
   a learning data generation unit acquiring, for the target image, object information allowing determination of an image region of the each target object and generating the learning data by using the acquired object information, wherein
   the learning data generation unit
      computes, for the each first estimation region, a total of a number or a ratio of a target object having a size within the first predetermined range, a predetermined ratio or greater of a region representing the target object being included in the first estimation region, by using the object information, and generates the first correct answer object count data indicating the computed total of a number or a ratio for the each first estimation region and
      computes, for the each second estimation region, a total of a number or a ratio of a target object having a size within the second predetermined range, a predetermined ratio or greater of a region representing the target object being included in the second estimation region, by using the object information, and generates the second correct answer object count data indicating the computed total of a number or a ratio for the each second estimation region.

10. The object count estimation apparatus according to any one of 7. to 9., further including:
    a first existence estimation network estimating existence of a target object having a size within the first predetermined range for the first estimation region related to each cell in the first feature map; and
    a second existence estimation network estimating existence of a target object having a size within the second predetermined range for the second estimation region related to each cell in the second feature map, wherein
    the learning data include first correct answer existence data indicating existence of a target object having a size within the first predetermined range for the each first estimation region in the target image and second correct answer existence data indicating existence of a target object having a size within the second predetermined range for the each second estimation region in the target image, and
    the learning unit computes a loss by using the first correct answer object count data, the second correct answer object count data, the first correct answer existence data, the second correct answer existence data, and an output acquired from each of the first counting network, the second counting network, the first existence estimation network, and the second existence estimation network by inputting the target image to the feature extraction network and based on the computed loss, performs learning of the feature extraction network, the first counting network, the second counting network, the first existence estimation network, and the second existence estimation network.

11. The object count estimation apparatus according to 10., further including
    a learning data generation unit acquiring, for the target image, object information allowing determination of an image region of the each target object and generating the learning data by using the acquired object information, wherein
    the learning data generation unit
       generates the first correct answer existence data indicating existence of the target object for the first estimation region including one or more target objects having a size within the first predetermined range and indicating nonexistence of the target object for the first estimation region including no target object having a size within the first predetermined range or generates the first correct answer existence data indicating existence of the target object for the first estimation region including a predetermined ratio or greater of an image region representing a target object having a size within the first predetermined range and indicating nonexistence of the target object for the first estimation region not including the predetermined ratio or greater of an image region representing a target object having a size within the first predetermined range, by using the object information, and generates the second correct answer existence data indicating existence of the target object for the second estimation region including one or more target objects having a size within the second predetermined range and indicating nonexistence of the target object for the second estimation region including no target object having a size within the second predetermined range or generates the second correct answer existence data indicating existence of the target object for the second estimation region including the predetermined ratio or greater of an image region representing a target object having a size within the second predetermined range and indicating nonexistence of the target object for the second estimation region not including the predetermined ratio or greater of an image region representing a target object having a size within the second predetermined range, by using the object information.

12. The object count estimation apparatus according to any one of 7. to 11., further including:
a first attribute estimation network estimating an attribute of a target object having a size within the first predetermined range for the first estimation region related to each cell in the first feature map; and
a second attribute estimation network estimating an attribute of a target object having a size within the second predetermined range for the second estimation region related to each cell in the second feature map, wherein
the learning data include a target image, first correct answer attribute data indicating an attribute of a target object having a size within the first predetermined range for the each first estimation region in the target image, and second correct answer attribute data indicating an attribute of a target object having a size within the second predetermined range for the each second estimation region in the target image, and
the learning unit computes a loss by using the first correct answer object count data, the second correct answer object count data, the first correct answer attribute data, the second correct answer attribute data, and an output acquired from each of the first counting network, the second counting network, the first attribute estimation network, and the second attribute estimation network by inputting the target image to the feature extraction network and based on the computed loss, performs learning of the feature extraction network, the first counting network, the second counting network, the first attribute estimation network, and the second attribute estimation network.

13. The object count estimation apparatus according to 12., further including
a learning data generation unit acquiring, for the target image, object information allowing determination of an image region and an attribute of the each target object and generating the learning data by using the acquired object information, wherein
the learning data generation unit
computes, for the each first estimation region, a statistic of an attribute of a target object having a size within the first predetermined range and being included in the first estimation region, by using the object information, and generates the first correct answer attribute data indicating the computed statistic for the each first estimation region and
computes, for the each second estimation region, a statistic of an attribute of a target object having a size within the second predetermined range and being included in the second estimation region, by using the object information, and generates the second correct answer attribute data indicating the computed statistic for the each second estimation region.

14. The object count estimation apparatus according to any one of 9., 11., and 13., wherein
the learning data generation unit
determines the each first estimation region in the target image, based on a ratio between a size of the first feature map and a size of the target image and
determines the each second estimation region in the target image, based on a ratio between a size of the second feature map and a size of the target image.

15. The object count estimation apparatus according to any one of 9., 11., 13., and 14., wherein
the learning data generation unit
computes a first reference size by multiplying a size of the first estimation region by a first predetermined ratio and computes the first predetermined range, based on the first reference size and
computes a second reference size by multiplying a size of the second estimation region by a second predetermined ratio and computes the second predetermined range, based on the second reference size.

16. The object count estimation apparatus according to 15., wherein
the first predetermined ratio is equal to the second predetermined ratio.

17. The object count estimation apparatus according to 15. or 16., wherein
a right end of the first predetermined range is equal to a left end of the second predetermined range,
a ratio of the first reference size to a left end of the first predetermined range is equal to a ratio of the second reference size to a left end of the second predetermined range, and
a ratio of the first reference size to a right end of the first predetermined range is equal to a ratio of the second reference size to a right end of the second predetermined range.

18. The object count estimation apparatus according to any one of 7. to 17., wherein
the learning unit
selects part of the first estimation region and the second estimation region that are included in the target image in such a way that a ratio between a number of cells of an estimation region having a number of the target object being zero and a number of cells of an estimation region having a number of the target object not being zero in first correct answer object count data and second correct answer object count data is a predetermined ratio and
performs learning, based on an error between an output of a network for the selected estimation region and learning data.

19. The object count estimation apparatus according to 10. or 11., wherein
the learning unit
selects, for learning of an existence estimation network, part of the first estimation region and the second estimation region that are included in the target image in such a way that a ratio between a number of cells of an estimation region for which nonexistence or an existence probability less than a threshold value is indicated and a number of cells of a remaining estimation region in first correct answer existence data and second correct answer existence data is a predetermined ratio, selects, for learning of a network other than an existence estimation network, an estimation region for which existence or an existence probability equal to or greater than a threshold value is indicated in first correct answer existence data and second correct answer existence data, the estimation region being part of the first estimation region and the second estimation region that are included in the target image, and performs learning, based on an error between a network output for the selected estimation region and learning data.

20. A control method executed by a computer,
the computer including:
a feature extraction network generating a first feature map and a second feature map by performing convolution processing on a target image;
a first counting network estimating, for each cell in the first feature map, a number of a target object having a size within a first predetermined range for a first estimation region being an image region in the target image related to the cell; and
a second counting network estimating, for each cell in the second feature map, a number of a target object having a size within a second predetermined range for a second estimation region being an image region in the target image related to the cell, the control method including:
by the feature extraction network, generating the first feature map and the second feature map from the target image;
by the first counting network, estimating a number of a target object having a size within the first predetermined range for the each first estimation region by using the first feature map; and
by the second counting network, estimating a number of a target object having a size within the second predetermined range for the each second estimation region by using the second feature map, wherein
a size of the first feature map is larger than a size of the second feature map, and
a size included in the first predetermined range is smaller than a size included in the second predetermined range.

21. The control method according to 20., further including,
by the feature extraction network, generating the first feature map by performing convolution processing on the target image and generating the second feature map by further performing convolution processing on the first feature map.

22. The control method according to 20. or 21., further including:
by the first counting network, estimating a number of a target object having a size within a first predetermined range for each attribute of a target object; and, by the second counting network, estimating a number of a target object having a size within a second predetermined range for each attribute of a target object.

23. The control method according to any one of 20. to 22., wherein
the computer further includes:
a first existence estimation network estimating existence of a target object having a size within the first predetermined range for the first estimation region related to each cell in the first feature map; and
a second existence estimation network estimating existence of a target object having a size within the second predetermined range for the second estimation region related to each cell in the second feature map, and the control method further includes:
by the first existence estimation network, estimating existence of a target object having a size within the first predetermined range for the each first estimation region by using the first feature map; and,
by the second existence estimation network, estimating existence of a target object having a size within the second predetermined range for the each second estimation region by using the second feature map.

24. The control method according to 23., further including:
for a first estimation region for which existence of the target object or an existence probability of the target object being equal to or greater than a threshold value is estimated by the first existence estimation network, using a number estimated by the first existence estimation network as a number of the target object in the first estimation region;
for a first estimation region for which nonexistence of the target object or an existence probability of the target object being less than a threshold value is estimated by the first existence estimation network, setting a number of the target object in the first estimation region to zero;
for a second estimation region for which existence of the target object or an existence probability of the target object being equal to or greater than a threshold value is estimated by the second existence estimation network, using a number estimated by the second existence estimation network as a number of the target object in the second estimation region; and
for a second estimation region for which nonexistence of the target object or an existence probability of the target object being less than a threshold value is estimated by the second existence estimation network, setting a number of the target object in the second estimation region to zero.

25. The control method according to any one of 20. to 24., the computer further including:
a first attribute estimation network estimating an attribute of a target object having a size within the first predetermined range for the first estimation region related to each cell in the first feature map;
a second attribute estimation network estimating an attribute of a target object having a size within the second predetermined range for the second estimation region related to each cell in the second feature map;

the control method further comprising:
by the first attribute estimation network, estimating an attribute of a target object having a size within the first predetermined range for the each first estimation region by using the first feature map; and,
by the second attribute estimation network, estimating an attribute of a target object having a size within the second predetermined range for the each second estimation region by using the second feature map.

26. The control method according to any one of 20. to 25., further including
performing learning of a network by using learning data, wherein
the learning data include a target image, first correct answer object count data indicating a number of a target object having a size within the first predetermined range for the each first estimation region in the target image, and second correct answer object count data indicating a number of a target object having a size within the second predetermined range for the each second estimation region in the target image, and
the control method further includes,
in learning of the network, computing a loss by using the first correct answer object count data, the second correct answer object count data, and an output acquired from each of the first counting network and the second counting network by inputting the target image to the feature extraction network and based on the computed loss, performing learning of the feature extraction network, the first counting network, and the second counting network.

27. The control method according to 26., further including:
by the first counting network, estimating a number of a target object having a size within a first predetermined range for each attribute of a target object; and,
by the second counting network, estimating a number of a target object having a size within a second predetermined range for each attribute of a target object, wherein
the learning data
further indicates an attribute of each target object included in the target image and
indicates the first correct answer object count data and the second correct answer object count data for each attribute of the target object.

28. The control method according to 26. or 27., further including:
acquiring, for the target image, object information allowing determination of an image region of the each target object and generating the learning data by using the acquired object information; and,
in generation of the learning data,
computing, for the each first estimation region, a total of a number or a ratio of a target object having a size within the first predetermined range, a predetermined ratio or greater of a region representing the target object being included in the first estimation region, by using the object information, and generating the first correct answer object count data indicating the computed total of a number or a ratio for the each first estimation region and
computing, for the each second estimation region, a total of a number or a ratio of a target object having a size within the second predetermined range, a predetermined ratio or greater of a region representing the target object being included in the second estimation region, by using the object information, and generating the second correct answer object count data indicating the computed total of a number or a ratio for the each second estimation region.

29. The control method according to any one of 26. to 28., wherein
the computer further includes:
a first existence estimation network estimating existence of a target object having a size within the first predetermined range for the first estimation region related to each cell in the first feature map; and
a second existence estimation network estimating existence of a target object having a size within the second predetermined range for the second estimation region related to each cell in the second feature map,
the learning data include first correct answer existence data indicating existence of a target object having a size within the first predetermined range for the each first estimation region in the target image and second correct answer existence data indicating existence of a target object having a size within the second predetermined range for the each second estimation region in the target image, and
the control method further includes,
in learning of the network, computing a loss by using the first correct answer object count data, the second correct answer object count data, the first correct answer existence data, the second correct answer existence data, and an output acquired from each of the first counting network, the second counting network, the first existence estimation network, and the second existence estimation network by inputting the target image to the feature extraction network and based on the computed loss, performing learning of the feature extraction network, the first counting network, the second counting network, the first existence estimation network, and the second existence estimation network.

30. The control method according to 29., further including:
acquiring, for the target image, object information allowing determination of an image region of the each target object and generating the learning data by using the acquired object information; and,
in generation of the learning data,
generating the first correct answer existence data indicating existence of the target object for the first estimation region including one or more target objects having a size within the first predetermined range and indicating nonexistence of the target object for the first estimation region including no target object having a size within the first predetermined range or generating the first correct answer existence data indicating existence of the target object for the first estimation region including a predetermined ratio or greater of an image region representing a target object having a size within the first predetermined range and indicating nonexistence of the target object for the first estimation region not including the predetermined ratio or greater of an image region representing a target object having a size within the first predetermined range, by using the object information, and generating the second correct answer existence data indicating existence of the target object for the second estimation region including one or more target objects having a size within the second predetermined range and indicating nonexistence of the target object for the second estimation region including no target object having a size within the second predetermined range or generating the second correct answer existence data indicating existence of the target object for the second estimation region including the predetermined ratio or greater of an image region representing a target object having a size within the second predetermined range and indicating nonexistence of the target object for the second estimation region not including the predetermined ratio or greater of an image region representing a target object having a size within the second predetermined range, by using the object information.

31. The control method according to any one of 26. to 30., wherein
the computer further includes:
a first attribute estimation network estimating an attribute of a target object having a size within the first predetermined range for the first estimation region related to each cell in the first feature map; and
a second attribute estimation network estimating an attribute of a target object having a size within the second predetermined range for the second estimation region related to each cell in the second feature map,
the learning data include a target image, first correct answer attribute data indicating an attribute of a target object having a size within the first predetermined range for the each first estimation region in the target image, and second correct answer attribute data indicating an attribute of a target object having a size within the second predetermined range for the each second estimation region in the target image, and
the control method further includes,
in learning of the network, computing a loss by using the first correct answer object count data, the second correct answer object count data, the first correct answer attribute data, the second correct answer attribute data, and an output acquired from each of the first counting network, the second counting network, the first attribute estimation network, and the second attribute estimation network by inputting the target image to the feature extraction network and based on the computed loss, performing learning of the feature extraction network, the first counting network, the second counting network, the first attribute estimation network, and the second attribute estimation network.

32. The control method according to 31., further including:
acquiring, for the target image, object information allowing determination of an image region and an attribute of the each target object and generating the learning data by using the acquired object information; and,
in generation of the learning data,
computing, for the each first estimation region, a statistic of an attribute of a target object having a size within the first predetermined range and being included in the first estimation region, by using the object information, and generating the first correct answer attribute data indicating the computed statistic for the each first estimation region and
computing, for the each second estimation region, a statistic of an attribute of a target object having a size within the second predetermined range and being included in the second estimation region, by using the object information, and generating the second correct answer attribute data indicating the computed statistic for the each second estimation region.

33. The control method according to any one of 28., 30., and 32., further including,
in generation of the learning data,
determining the each first estimation region in the target image, based on a ratio between a size of the first feature map and a size of the target image and
determining the each second estimation region in the target image, based on a ratio between a size of the second feature map and a size of the target image.

34. The control method according to any one of 28., 30., 32., and 33., further including,
in generation of the learning data,
computing a first reference size by multiplying a size of the first estimation region by a first predetermined ratio and computing the first predetermined range, based on the first reference size and
computing a second reference size by multiplying a size of the second estimation region by a second predetermined ratio and computing the second predetermined range, based on the second reference size.

35. The control method according to 34., wherein the first predetermined ratio is equal to the second predetermined ratio.

36. The control method according to 34. or 35., wherein
a right end of the first predetermined range is equal to a left end of the second predetermined range,
a ratio of the first reference size to a left end of the first predetermined range is equal to a ratio of the second reference size to a left end of the second predetermined range, and
a ratio of the first reference size to a right end of the first predetermined range is equal to a ratio of the second reference size to a right end of the second predetermined range.

37. The control method according to any one of 26. to 36., further including,
in learning of the network,
selecting part of the first estimation region and the second estimation region that are included in the target image in such a way that a ratio between a number of cells of an estimation region having a number of the target object being zero and a number of cells of an estimation region having a number of the target object not being zero in first correct answer object count data and second correct answer object count data is a predetermined ratio and performing learning, based on an error between an output of a network for the selected estimation region and learning data.

38. The control method according to 29. or 30., further including,
in learning of the network,
selecting, for learning of an existence estimation network, part of the first estimation region and the second estimation region that are included in the target image in such a way that a ratio between a number of cells of an estimation region for which nonexistence or an existence probability less than a threshold value is indicated and a number of cells of a remaining estimation region in first correct answer existence data and second correct answer existence data is a predetermined ratio,
selecting, for learning of a network other than an existence estimation network, an estimation region for which existence or an existence probability equal to or greater than a threshold value is indicated in first correct answer existence data and second correct answer existence data, the estimation region being part of the first estimation region and the second estimation region that are included in the target image, and
performing learning, based on an error between a network output for the selected estimation region and learning data.

39. A program causing a computer to execute the control method according to any one of 20. to 38.

REFERENCE SIGNS LIST

10 Target image
20 First feature map
30 Second feature map
50 Map
60 Map
70 Map
1000 Computer
1020 Bus
1040 Processor
1060 Memory
1080 Storage device
1100 Input-output interface
1120 Network interface
2000 Object count estimation apparatus
2042 First feature extraction network
2044 First counting network
2046 First existence estimation network
2048 First attribute estimation network
2062 Second feature extraction network
2064 Second counting network
2066 Second existence estimation network
2068 Second attribute estimation network
2100 Learning unit
2120 Learning data generation unit

What is claimed is:

1. An object count estimation apparatus comprising:
at least one memory storing instructions; and
at least one processor configured to execute the instructions to:
generate a first feature map by performing convolution processing on a target image;
generate a second feature map by further performing convolution processing on the first feature map;
estimate, for each cell in the first feature map, a number of a first target object having a size within a first predetermined range for a first estimation region being an image region in the target image related to the cell; and
estimate, for each cell in the second feature map, a number of a second target object having a size within a second predetermined range for a second estimation region being an image region in the target image related to the cell, wherein
a size of the first feature map is larger than a size of the second feature map, and
a size included in the first predetermined range is smaller than a size included in the second predetermined range.

2. The object count estimation apparatus according to claim 1, wherein
the number of the first target object is estimated for each attribute of the first target object, and
the number of the second target object is estimated for each attribute of the second target object.

3. The object count estimation apparatus according to claim 1, wherein
the at least one processor configured to execute further instructions to:
estimate existence of the first target object for the first estimation region related to each cell in the first feature map; and
estimate existence of the second target object for the second estimation region related to each cell in the second feature map.

4. The object count estimation apparatus according to claim 3, wherein,
for an initial estimation region for which nonexistence of the first target object or an existence probability of the first target object being less than a threshold value is estimated, the estimated number of the first target object is set to zero,
for a subsequent estimation region for which nonexistence of the second target object or an existence probability of the second target object being less than a threshold value is estimated, the estimated number of the second target object is set to zero.

5. The object count estimation apparatus according to claim 1, wherein
the at least one processor configured to execute further instructions to:
estimate an attribute of the first target object for the first estimation region related to each cell in the first feature map; and
estimate an attribute of the second target object for the second estimation region related to each cell in the second feature map.

6. An object count estimation apparatus comprising:
at least one memory storing instructions; and
at least one processor configured to execute the instructions to:
perform learning of networks including a feature extraction network, a first counting network and a second counting network by using learning data,
generate a first feature map by performing convolution processing on a target image using the feature extraction network;
generate a second feature map by further performing convolution processing on the first feature map using the feature extraction network,
estimate, for each cell in the first feature map using the first counting network, a number of a first target object having a size within a first predetermined range for a first estimation region being an image region in the target image related to the cell; and estimate, for each cell in the second feature map using the second counting network, a number of a second target object having a size within a second predetermined range for a second estimation region being an image region in the target image related to the cell, wherein a size of the first feature map is larger than a size of the second feature map, a size included in the first predetermined range is smaller than a size included in the second predetermined range, the learning data include a training image, first correct answer object count data indicating a number of the first target object for the each first estimation region in the training image, and second correct answer object count data indicating a number of the second target object for the each second estimation region in the training image, and learning of the networks is performed based on a loss computed by using the first correct answer object count data, the second correct answer object count data, and an output acquired from each of the first counting network and the second counting network by inputting the training image to the feature extraction network.

7. The object count estimation apparatus according to claim 6, wherein the number of the first target object is estimated for each attribute of the first target object, the number of the second target object is estimated for each attribute of the second target object, and the learning data further indicates an attribute of each of the first target object and the second target object included in the training image and indicates the first correct answer object count data for each attribute of the first target object and the second correct answer object count data for each attribute of the second target object.

8. The object count estimation apparatus according to claim 6, wherein the at least one processor configured to execute further instructions to:

acquire, for the training image, object information allowing determination of image regions of the each first target object and each second target object, and generate the learning data by using the acquired object information, wherein generating the learning data includes computing, for the each first estimation region in the training image, a total of a number or a ratio of the first target object, a predetermined ratio or greater of a region representing the first target object being included in the first estimation region, by using the object information, and generating the first correct answer object count data indicating the computed total of a number or a ratio for the each first estimation region and computing, for the each second estimation region in the training image, a total of a number or a ratio of the second target object, a predetermined ratio or greater of a region representing the second target object being included in the second estimation region, by using the object information, and generating the second correct answer object count data indicating the computed total of a number or a ratio for the each second estimation region.

9. The object count estimation apparatus according to claim 8, wherein generate the learning data includes determining the each first estimation region in the training image, based on a ratio between a size of the first feature map and a size of the training image and determining the each second estimation region in the training image, based on a ratio between a size of the second feature map and a size of the training image.

10. The object count estimation apparatus according to claim 8, wherein generate the learning data includes computing a first reference size by multiplying a size of the first estimation region by a first predetermined ratio, computing the first predetermined range, based on the first reference size, computing a second reference size by multiplying a size of the second estimation region by a second predetermined ratio, and computing the second predetermined range, based on the second reference size.

11. The object count estimation apparatus according to claim 10, wherein the first predetermined ratio is equal to the second predetermined ratio.

12. The object count estimation apparatus according to claim 10, wherein an upper bound of the first predetermined range is equal to a lower bound of the second predetermined range, a ratio of the first reference size to a lower bound of the first predetermined range is equal to a ratio of the second reference size to the lower bound of the second predetermined range, and a ratio of the first reference size to the upper bound of the first predetermined range is equal to a ratio of the second reference size to an upper bound of the second predetermined range.

13. The object count estimation apparatus according to claim 6, wherein the networks further include a first existence estimation network and a second existence estimation network, and the at least one processor configured to execute further instructions to:

estimate existence of a first target object using the first existence estimation network for the first estimation region related to each cell in the first feature map; and estimate existence of a second target object using the second existence estimation network for the second estimation region related to each cell in the second feature map, wherein the learning data include first correct answer existence data indicating existence of the first target object for the each first estimation region in the training image and second correct answer existence data indicating existence of the second target object for the each second estimation region in the training image, and learning of the networks is performed based on the loss computed by using the first correct answer object count data, the second correct answer object count data, the first correct answer existence data, the second correct answer existence data, and an output acquired from each of the first counting network, the second counting network, the first existence estimation network, and the second existence estimation network by inputting the training image to the feature extraction network.

14. The object count estimation apparatus according to claim 13, wherein
the at least one processor configured to execute further instructions to:
acquire, for the training image, object information allowing determination of image regions of the each first target object and each second target object, and
generate the learning data by using the acquired object information, wherein
generating the learning data includes generating the first correct answer existence data indicating existence of the first target object for the first estimation region of the training image, including one or more first target objects and indicating nonexistence of the first target object for the first estimation region of the training image, including no first target object or generates the first correct answer existence data indicating existence of the first target object for the first estimation region of the training image, including a predetermined ratio or greater of an image region representing a first target object and indicating nonexistence of the first target object for the first estimation region of the training image, not including the predetermined ratio or greater of an image region representing a first target object, by using the object information, and
generating the second correct answer existence data indicating existence of the second target object for the second estimation region of the training image, including one or more second target objects and indicating nonexistence of the second target object for the second estimation region of the training image, including no second target object or generates the second correct answer existence data indicating existence of the second target object for the second estimation region of the training image, including the predetermined ratio or greater of an image region representing a second target object and indicating nonexistence of the second target object for the second estimation region of the training image, not including the predetermined ratio or greater of an image region representing a second target object, by using the object information.

15. The object count estimation apparatus according to claim 6, wherein
the networks further include a first attribute estimation network and a second attribute estimation network, and
the at least one processor configured to execute further instructions to:
estimate an attribute of a first target object using the first attribute estimation network for the first estimation region related to each cell in the first feature map; and
estimate an attribute of a second target object using the second attribute estimation network for the second estimation region related to each cell in the second feature map, wherein
the learning data include a training image, first correct answer attribute data indicating an attribute of a first target object for the each first estimation region in the training image, and second correct answer attribute data indicating an attribute of a second target object for the each second estimation region in the training image, and learning of the networks is performed based on the loss computed by using the first correct answer object count data, the second correct answer object count data, the first correct answer attribute data, the second correct answer attribute data, and an output acquired from each of the first counting network, the second counting network, the first attribute estimation network, and the second attribute estimation network by inputting the training image to the feature extraction network.

16. The object count estimation apparatus according to claim 15, wherein
the at least one processor configured to execute further instructions to:
acquire, for the training image, object information allowing determination of image regions of the each first target object and each second target object, and
generate the learning data by using the acquired object information, wherein
generating the learning data includes
computing, for the each first estimation region in the training image, a statistic of an attribute of the first target object being included in the first estimation region, by using the object information, and generating the first correct answer attribute data indicating the computed statistic for the each first estimation region in the training image and
computing, for the each second estimation region in the training image, a statistic of an attribute of the second target object being included in the second estimation region, by using the object information, and generating the second correct answer attribute data indicating the computed statistic for the each second estimation region in the training image.

17. The object count estimation apparatus according to claim 6, wherein
learning of the networks including
selecting part of the first estimation region and the second estimation region that are included in the training image in such a way that a ratio between a number of cells of an estimation region having a number of the first target object and the second target object being zero and a number of cells of an estimation region having a number of the first target object and the second target object not being zero in first correct answer object count data and second correct answer object count data is a predetermined ratio and
performing learning, based on an error between an output of the networks for the selected estimation region and learning data.

18. A control method performed by a computer and comprising:
generating a first feature map by performing convolution processing on a target image;
generating a second feature map by further performing convolution processing on the first feature map;
estimating, for each cell in the first feature map, a number of a first target object having a size within a first predetermined range for a first estimation region being an image region in the target image related to the cell; and
estimating, for each cell in the second feature map, a number of a second target object having a size within a second predetermined range for a second estimation region being an image region in the target image related to the cell, wherein a size of the first feature map is larger than a size of the second feature map, and a size included in the first predetermined range is smaller than a size included in the second predetermined range.

19. A non-transitory computer readable medium storing a program executable by the computer to perform the control method according to claim 18.

* * * * *